United States Patent
Beckhaus et al.

(10) Patent No.: US 6,258,744 B1
(45) Date of Patent: Jul. 10, 2001

(54) CATALYST SYSTEM BASED ON FULVENE CYCLOPENTADIENYL METAL COMPLEXES

(75) Inventors: Rüdiger Beckhaus, Oldenburg; Jürgen Heinrichs, Aachen; Sigurd Becke, Rösrath, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/373,820

(22) Filed: Aug. 13, 1999

(30) Foreign Application Priority Data

Aug. 20, 1998 (DE) .............................. 198 37 739

(51) Int. Cl.$^7$ ..................................... B01J 31/16
(52) U.S. Cl. .................. 502/118; 502/103; 502/104; 502/118; 502/123; 502/125; 502/122
(58) Field of Search .................... 502/104, 103, 502/118, 123, 125, 122, 114

(56) References Cited

U.S. PATENT DOCUMENTS

| | | | |
|---|---|---|---|
| 4,542,199 | 9/1985 | Kaminsky et al. | 526/160 |
| 4,892,651 | 1/1990 | Ewen et al. | 502/104 |
| 5,026,798 | 6/1991 | Canich | 526/127 |
| 5,132,380 | 7/1992 | Stevens et al. | 526/126 |
| 5,145,819 | 9/1992 | Winter et al. | 502/117 |
| 5,276,208 | 1/1994 | Winter et al. | 556/53 |
| 5,703,187 | 12/1997 | Timmers | 526/282 |
| 6,054,405 | * 4/2000 | Wenzel | 502/104 |

FOREIGN PATENT DOCUMENTS

| | | |
|---|---|---|
| 19732804 | 2/1999 | (DE) . |
| 0 129 368 | 7/1989 | (EP) . |
| 96/13529 | 5/1996 | (WO) . |

OTHER PUBLICATIONS

J. Am. Chem. Soc. (month unavailable) 1993, 115, pp. 12569–12570, Richard D. Broene and. Stephen L. Buchwald "Asymmetric Hydrogenation of Unfunctionalized Trisubstituted Olefins with a Chiral Titanocene Catalyst".

J. Am. Chem. Soc. (month unavailable) 1994, 116, pp. 8952–8965 Christopher A. Willoughby. And Stephen L. Buchwald, "Catalytic Asymmetric Hydrogenation of Imines with a Chiral Titanocene Catalyst: Scope and Limitations".

J. Chem. Soc., Chem. Commun. (month unavailable) 1995, pp. 1181–1182, Willaim Odenkirk and B. Bosnich, "Homogeneous Catalysis: Use of Chiral Titanocene Complexes for Asymmetric Catalytic Diels–Alder Reactions".

Journal of American Chemical Society, Feb. 23, 1972, 94, pp. 1219–1238 John E. Bercaw, Robert H. Marvich, Larry G. Bell and Hans H. Brintzinger, "Titanocene as an Intermediate in Reactions Involving Molecular Hydrogen and Nitrogen".

Journal of American Chemical Society, 110, (month unavailable) 1988, pp. 7701–7715, Laurel. E. Schock and Tobin J. Marks, "Organometallic Thermochemistry, Metal Hydrocarbyl, Hydride, Halide, Carbonyl, Amide, and Alkoxide Bond Enthalpy Relationships and Their Implications in Pentamethylcyclopentadienyl and Cyclopentadienyl Complexes of Zirconium and Hafnium".

Organmetallics, (month unavailable) 1991, pp. 2665–2671, Rosa Fandos, Auke Meetsma and Jan H. Teuben, Formation of $\eta^1$–Iminoacyl Compounds by Insertion of Isonitriles In Pentamethylcyclopentadienyl–Tetramethylfulvene Compounds of Titanium and Zirconium. Intramolecular C–H Activation of a Pentamethylcyclopentadienyl Group to Give a Tridentate Ligand with Two Bridge Cyclopentadienyl Rings and a Titanium–Vinyl Bond in the Bridge. Molecular Structure of $[\eta^5:\eta^1:\eta^5-C_5Me_4CH_2C(NHXyL)=CN(Xyl)CH_2C_5Me_4]TICl$ and $Cp^*[\eta^5:\eta^1-C_5Me_4CH_2C(=NXyl)C(=NXyl)]ZrCl$ (Xyl = 2,6–$Me_2C_5H_3$).

Organmetallics, (month unavailable) 1991, 10, pp. 1637–1639. Rosa Fandos and Han H. Teuben, Reactivity of Early–Transition–metal Fulvene complexes. Transformation of a 2,3,4,5– Tetramethylfulvene Ligand into a Bidentate Dialkoxide with Four Asymmetric Carbon Atoms. Molecular Structure of $Tl[OCHPh)_2C_5Me_4(CH_2)]Cl_2$.

* cited by examiner

*Primary Examiner*—David W. Wu
*Assistant Examiner*—Caixia Lu
(74) *Attorney, Agent, or Firm*—Joseph C. Gil; Noland J. Cheung (57) ABSTRACT

The present invention relates to a catalyst system based on fulvene cyclopentadienyl metal complexes, to a method of producing said catalyst system and to the use thereof for the polymerization and copolymerization of olefins and/or dienes.

7 Claims, 2 Drawing Sheets

CATALYST SYSTEM BASED ON FULVENE CYCLOPENTADIENYL METAL COMPLEXES

FIELD OF THE INVENTION

The present invention relates to a catalyst system based on fulvene cyclopentadienyl metal complexes, to a method of producing said catalyst system and a process for the polymerization and copolymerization of olefins and/or dienes using such catalyst systems.

BACKGROUND OF THE INVENTION

Since the discovery of ferrocene, metal complexes with cyclopentadienyl ligands have been intensively investigated. The use of biscyclopentadienyl-metal complexes (metallocenes), in admixture with activating co-catalysts, preferably alumoxanes, for the polymerization of olefins and diolefins has long been known (e.g., EP-A 69,951, 129,368, 351,392, 485,821, 485,823). Metallocenes have proved to be highly effective, specific catalysts for the polymerization of olefins. In combination with co-catalysts, metal complexes with only one cyclopentadienyl ligand (semi-sandwich complexes) are also suitable as specific polymerization catalysts (U.S. Pat. No. 5,132,380, EP 416,815, WO 91/04257, WO 96/13529). There is therefore a multiplicity of new metallocene catalysts or semi-sandwich catalysts for the polymerization of olefinic compounds which have been developed in recent years in order to increase catalyst activity and selectivity and to control the microstructure, molecular weights and molecular weight distribution thereof. Metal complexes with cyclopentadienyl ligands, particularly chiral ansa-metallocenes, have also been described as hydrogenation catalysts, e.g., for olefins or imines (J. Am. Chem. Soc. 1993,115,12569. J. Am. Chem. Soc. 1994,116, 8952–8965). Chiral metallocenes are also used as catalysts in asymmetric synthesis, e.g. for asymmetric Diels-Alder reactions (J. Chem. Soc. Chem. Commun. 1995, 1181).

However, relatively little is known about metal complexes with fulvene ligands.

According to Bercaw et al., JACS (1972), 94, 1219, the fulvene complex ($\eta^6$-2,3,4,5-tetra-methylcyclopentadienyl-1-methylene)($\eta^5$-pentamethylcyclopentadienyl)titaniummethyl is formed by the thermolysis of bis($\eta^5$-pentamethylcyclopentadienyl)-titaniumdimethyl. T. J. Marks et al., JACS (1988), 110, 7701 have described the thermolysis of pentamethylcyclopentadienyl complexes of zirconium and hafnium. The fulvene complex ($\eta^6$-2,3,4,5-tetramethylcyclopentadienyl-1-methylene)($\eta^5$-pentamethylcyclopentadienyl)zirconiumphenyl is formed by the thermolysis of bis($\eta^5$-penta-methylcyclopentadienyl)zirconiumdiphenyl.

Metal fulvene complexes and a method of producing them were described in a previous Application (German Patent Application 19 756 742.8). Metal fulvene complexes which cannot be obtained by a thermal method can be obtained in high yield by the reaction of a fulvene compound with a suitable transition metal complex in the presence of a reducing agent. The direct introduction of the fulvene ligand provides access to a multiplicity of new fulvene metal complexes. In combination with co-catalysts, specific polymerization catalysts can be produced, the catalytic activity of which is comparable with the activity of catalysts based on metallocenes.

A method for the thermal production of metal fulvene complexes and their use as polymerization catalysts in combination with co-catalysts are described in the prior Application DE 19 732 804.0. In combination with co-catalysts, specific polymerization catalysts can be produced, the catalytic activity of which is comparable with the activity of catalysts based on metallocenes. One disadvantage is that metal fulvene complexes are extremely sensitive to air and moisture. Metal fulvene complexes therefore have to be produced and stored under inert gas conditions.

Little is known about the reaction behavior of metal fulvene complexes. The reaction of aldehydes and ketones with the complex compound ($\eta^6$-cyclopentadienyl-1-methylene)($\eta^5$-methylcyclopenta-dienyl)phenyltitanium is described in Z. Naturforsch. 44 b, 1989, 1593–1598. The reaction of ($\eta^6$-2,3,4,5-tetramethylcyclo-pentadienyl-1-methylene)($\eta^5$-pentamethylcyclopentadienyl)titanium chloride with acetophenone is described in Organometallics, 1991, 10, 1637–1639. The reaction of isonitriles with pentamethylcyclopentadienyl-tetramethylfulvene complexes of titanium and zirconium is described in Organometallics 1991, 10, 2665–2671. On their own, however, the reaction products described above exhibit no activity for the polymerization of olefinic compounds.

SUMMARY OF THE INVENTION

The object of the present invention was to identify a catalyst system, which, at least in part, avoids the disadvantages described above. In particular, the object was to identify stable catalysts which can be synthesized in a simple manner and which are easy to handle industrially, and which can be activated without problems for the polymerization of olefinic compounds in particular.

Surprisingly, it has now been found that catalyst systems based on fulvene cyclopentadienyl metal complexes, in combination with unsaturated compounds which contain one or more hetero atoms, are particularly suitable for the achievement of the stated object.

The present invention relates to a catalyst system which can be produced by the reaction of a) a fulvene cyclopentadienyl metal complex of formula (I):

wherein

M is a metal of the group comprising titanium, zirconium and hafnium,

A denotes a cyclopentadienyl of formula $C_5H_qR^7_{5-q}$, where q represents 0, 1, 2, 3, 4 or 5, an idenyl of formula $C_9H_{7-r}R^7_r$, where r represents 0, 1, 2, 3, 4, 5, 6 or 7, or a fluorenyl of formula $C_{13}H_{9-p}R^7_p$, where p represents 0, 1, 2, 3, 4, 5, 6, 7 or 8, X denotes a hydrogen atom, a $C_1$ to $C_{10}$ alkyl group, a $C_1$ to $C_{10}$ alkoxy group, a $C_6$ to $C_{10}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a halogen atom or an amide of formula $NR^7_2$, $R^1$, $R^2$, $R^3$, $R^4$, $R^5$, and $R^6$ are the same or different and represent hydrogen, a halogen, a cyano group, a $C_1$ to $C_{20}$ alkyl group, a $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a $C_2$ to $C_{10}$ alkynyl group, a silyl group substituted by $C_1$–$C_{10}$ hydrocaarbon radicals, a sulphide group substituted by a $C_1$–$C_{10}$ hydrocarbon radical, or an amino group which is optionally substituted by $C_1$–$C_{20}$ hydrocarbon radicals, or $R^1$, $R^2$, $R^3$, $R^4$, $R^5$, and $R^6$ each form one or more aliphatic or aromatic ring systems together with the atoms which bond them, which ring systems may contain one or more hetero atoms (O, N, S) and comprise 5 to 10 carbon atoms, $R^7$ represents hydrogen, a $C_1$ to $C_{20}$ alkyl group, a $C_6$ to $C_{20}$ aryl group, a $C_7$ to $C_{40}$ arylalkyl group, a $C_7$ to $C_{40}$ alkylaryl group, a silyl group which is substituted by $C_1$–$C_{10}$ hydrocarbon radicals, or an amino group which is optionally substituted a silyl group which is substituted by $C_1$–$C_{10}$ hydrocarbon radicals, or an amino group which is optionally substituted by $C_1$–$C_{20}$ hydrocarbon radicals, b) an unsaturated compound of formula (II):

$$R^8_a R^9_b CY \quad (II),$$

wherein $R^8$ and $R^9$ are the same or different, and denote a hydrogen atom, a halogen atom, a hydroxy group, a $C_1$ to $C_{10}$ alkyl group, a $C_1$ to $C_{10}$ alkoxy group, a $C_6$ to $C_{10}$ aryl group which is optionally substituted by halogen atoms, a $C_6$ to $C_{10}$ aryloxy group, a $C_2$ alkylaryl group, a $C_8$ to $C_{40}$ arylalkenyl group, an amino group which is optionally substituted by $C_1$–$C_{20}$ hydrocarbon radicals, or an imino group which is optionally substituted by $C_1$–$C_{20}$ hydrocarbon radicals, Y denotes a nitrogen atom, an oxygen atom, a sulphur atom or a group of formula $NR^{10}$, wherein $R^{10}$ has the same meaning as $R^8$ and $R^9$, and a and b represent the numbers 0 or 1, and subsequent reaction of the product with c) a co-catalyst.

DETAILED DESCRIPTION OF THE INVENTION

The molar ratio of component a) to component c) advantageously falls within the range from 1:0.1 to 1:10,000, preferably from 1:0.5 to 1:1000, most preferably from 1:1 to 1:1000.

The compounds which are preferably used as unsaturated compounds of formula (II) comprise compounds of formula (IIa):

(IIa)

wherein $R^8$, $R^9$ and Y have the meanings given above and $R^8$ and $R^9$ optionally, form a ring system, which may contain one or more hetero atoms (O, N, S), with the carbon atom which bonds them, or compounds of formula (IIb), $$R^{11}—C\equiv N \quad (IIb)$$

or compounds of formula (IIc), $$C\equiv N—R^{11} \quad (IIc)$$

or compounds of formula (IId)

$$R^{11}—N=C=Y \quad (IId)$$

wherein Y represents an oxygen atom or a sulphur atom, and $R^{11}$ denotes a hydrogen atom, a $C_1$ to $C_{10}$ alkyl group, a $C_6$ to $C_{10}$ aryl group which is optionally substituted by halogen atoms, $C_7$ to $C_{40}$ arylalkyl group or a $C_7$ to $C_{40}$ alkylaryl group.

Compounds of formula (IIa) are particularly preferred in which Y represents an oxygen atom and $R^8$ and $R^9$ have the meanings given above. Compounds such as these comprise aldehydes such as formaldehyde, acetaldehyde, propionaldehyde, n-butyraldehyde, isobutyraldehyde, pivalinaldehyde, octanal, octadecenal, acrolein, crotonaldehyde, benzaldehyde or furfural for example, dialdehydes such as glyoxal for example, and ketones, such as acetone, methyl ethyl ketone, diethyl ketone, hexanone-(2), hexanone-(3), methyl tert.-butyl ketone, di-n-propyl ketone, diisopropyl ketone, diisobutyl ketone, di-tert.-butyl ketone, dicyclohexyl ketone, methyl cyclohexyl ketone, diamyl ketone, heptadecyl phenyl ketone, mesitylene oxide, phorone, isophorone, acetophenone, 4-fluoroacetophenone, 3.5-di(trifluoro-methyl)-acetophenone, pentamethylacetophenone, benzophenone, 4,4'-difluorobenzo-phenone, decafluoro-benzophenone, benzal acetone, deoxybenzoin, cyclohexanone, menthone, camphor, and fluorenone for example, and diketones, such as diacetylacetylacetone for example, esters of carboxylic acids, such as ethyl acetate or benzyl benzoate for example.

The preferred compounds of formula (IIb) include nitriles, such as acetonitrile, n-butyronitrile, 4-chlorophenyinitrile, pivalic acid nitrile and cinnamic acid nitrile for example. The preferred compounds of formula (IIc) include isonitriles, such as 2,6-di-methylphenylisonitrile for example. The preferred compounds of formula (IId) include isocyanates and thioisocyanates, such as cyclohexyl isocyanate and methyl isocyanate, for example.

Other preferred compounds of formula (II) include unsaturated compounds of formula (IIa) in which Y denotes a group of formula $NR^{10}$ and $R^8$ and $R^9$ have the meanings given above. Compounds such as these comprise imines, such as acetophenone benzylimine for example, and hydrazones, such as acetophenone hydrazone for example.

The present invention further relates to a method of producing the catalyst system. Components a), b) and c) of the catalyst system according to the present invention are reacted in a fixed sequence, wherein components a) and b) are first reacted with each other. This reaction can be conducted by reacting component a) in a suitable solvent with component b) at room temperature. The molar ratio of a) to b) falls within the range from 100:1 to 0.1:1, preferably from 10:1 to 0.5:1. The resulting reaction product can be isolated and can be brought into contact with component c) in a separate reaction step. Prior isolation of the reaction product from the reaction of components a) and b) can also optionally be omitted. The molar ratio of a) to c) advantageously falls within the range from 1:0.1 to 1:10,000, and is preferably between 1:0.5 and 1:5000, most preferably between 1:1 and 1:1000. Suitable solvents include aliphatic or aromatic hydrocarbons. Examples thereof include unbranched aliphatic hydrocarbons such as butane, pentane, hexane, heptane or octane, branched aliphatic hydrocarbons such as isobutane, isopentane or isohexane, cyclic aliphatic hydrocarbons such as cyclohexane or methylcyclohexane, aromatic hydrocarbons such as benzene, toluene and xylene. Hexane or toluene is preferred. Mixtures of different solvents are also suitable.

Production of the catalyst system according to the present invention is conducted with the exclusion of air and water under inert conditions (protective gas technique). Examples of inert gases include nitrogen and argon. The Schlenk technique which is generally customary for organometallic substances is suitable as the protective gas technique, for example.

Fulvene cyclopentadienyl metal complexes of formula (I) can be synthesized by the reaction of a transition metal compound of formula (III):

$$AX_sL_nM \qquad (III),$$

wherein

A, X and M have the meanings given above,

L represents a neutral ligand, s denotes the numbers 1, 2 or 3, and n is a number from 0 to 4, with a fulvene compound of formula (IV):

(IV)

wherein $R^1$, $R^2$, $R^3$, $R^4$, $R^5$ and $R^6$ have the meanings given above, in the presence of a reducing agent. Examples of suitable reducing agents include alkali metals or alkaline earth metals, $C_1$–$C_6$ alkyllithium, tri-$C_1$–$C_6$ alkylaluminum compounds and Grignard reagents. The reducing agents which are particularly preferred are lithium, sodium amalgam, magnesium and n-butyl lithium. The reaction is preferably conducted in an ether, such as diethyl ether or tetrahydrofuran for example.

The preferred compounds of formula (IV) are fulvene compounds of formula (V):

(V)

or fulvene compounds of formula (VI):

(VI)

wherein $R^1$, $R^2$, $R^3$ and $R^4$ have the meanings given above.

Compounds of formula (IV) which are particularly preferred include 6-cyclohexylfulvene, 6-iso-propylfulvene, 6-tert-butylfulvene, 6-phenyl-fulvene, 6-(dimethylamino)-fulvene, 6,6-bis(dimethylamino)fulvene, 6,6-dimethylfulvene, 6,6-bis(trifluoromethyl)fulvene, 6,6-diphenylfulvene, 6,6-bis(pentafluorophenyl)fulvene, 6,6-pentamethylenefulvene, 6,6-tetra-methylenefulvene, 6,6-trimethylenefulvene 2-(2,4-cyclopentadien-1-ylidene)-1,3-dithiolane, 5-benzylidene-1,2,3-triphenyl-1,3-cyclopentadiene, 1,2,3,4-tetramethyl-fulvene, 1,2,3,4-tetraphenylfulvene, 2,3-dimethylfulvene, 2,3-diisopropylfulvene, 2,3-diphenylfulvene, 1,4-dimethyl-2,3-diphenylfulvene and 1,4-diethyl-2,3-diphenylfulvene.

The production of special fulvene cyclopentadienyl metal complexes of formula (I) by a thermal method, wherein the $R^1$ and $R^2$ radicals denote hydrogen, is known, and is described by T. J. Marks, et al. in Organometallics 1987, 6, 232–241, for example.

The preferred fulvene cyclopentadienyl metal complexes of formula (I) are those in which $R^1$ to $R^6$ represent a $C_1$–$C_{30}$ alkyl group, a $C_6$–$C_{10}$ aryl group, a $C_7$–$C_{40}$ alkylaryl group, and in particular, represent hydrogen, methyl, trifluoromethyl, ethyl, n-propyl, isopropyl, n-butyl, isobutyl, tert.-butyl, phenyl, pentafluorophenyl, methyl-phenyl, cyclohexyl or benzyl, A represents cyclopentadienyl, methylcyclopentadienyl, benzylcyclopentadienyl, propylcyclopentadienyl, n-butyl-cyclopentadienyl, iso-butylcyclopentadienyl, t-butylcyclopentadienyl, cyclopentylcyclopentadienyl, octadecylcyclo-pentadienyl, 1,2-dimethylcyclopentadienyl, 1,3-dimethylcyclopentadienyl, 1,3-di-isopropyl-cyclopentadienyl, 1,3-di-t-butylcyclopentadienyl, 1-ethyl-2-methyl-cyclopentadienyl, 1-isopropyl-3-methylcyclopentadienyl, 1-(n-butyl)-3-methylcyclopentadienyl, 1-(t-butyl)-3-methylcyclopentadienyl, pentamethylcyclopentadienyl, 1,2,3,4-tetramethyl-cyclopentadienyl, 1,2,4-trimethyl-cyclopentadienyl, 1,2,4-tri-isopropyl-cyclopentadienyl, 1,2,4-tri(t-butyl)-cyclopentadienyl, indenyl, tetrahydroindenyl, 2-methylindenyl, 4,7-dimethylindenyl, 2-methyl-4,5-benzoindenyl, 2-methyl-4-phenylindenyl, fluorenyl or 9-methyl-fluorenyl, X denotes chlorine, methyl, benzyl, neopentyl or phenyl, and M has the meaning given above.

Formula (I) which is given for the metal fulvene complexes should be considered as a formal representation of the bonding relationships, and constitutes one example of a structural variant. The bonding relationships in these metal complexes depend, amongst other factors, on the central atom, on the oxidation state, and on the substituents on the fulvene-ligand.

Suitable co-catalysts for polymerization processes include the co-catalysts which are known in the field of metallocene catalysis, such as polymeric or oligomeric aluminoxanes, Lewis acids, and aluminates and borates. In this connection, reference is made in particular to Macromol. Symp. Vol. 97, July 1995, pages 1–246 (for alumoxanes) and to EP 277003, EP 277004, Organometallics 1997, 16. 842–857 (for borates), and to EP 573403 (for aluminates).

Co-catalysts which are particularly suitable include methyl-aluminoxane, methylalumoxane which is modified by triisobutylaluminum, diisobutylalumoxane, trialkylaluminum compounds such as trimethylaluminum, triethylaluminum, triisobutylaluminum or triisooctylaluminum, and also dialkylaluminum compounds such as diisobutylaluminum hydride, diisobutylaluminum fluoride and diethylaluminum chloride, substituted triarylaluminum compounds such as tris-(pentafluorophenyl)-aluminum, ionic compounds which contain tetrakis-(pentafluorophenyl)aluminate as their anion, such as triphenylmethyl-tetrakis (pentafluorophenyl)aluminate, as well as N,N-dimethylanilinium-tetrakis-(pentafluorophenyl) aluminate, substituted triarylboron compounds such as tris-(pentafluorophenyl)boron, and ionic compounds which contain tetrakis(pentafluorphenyl)borate as their anion, such as triphenylmethyl tetrakis-(pentafluorophenyl)borate, and N,N-dimethylanilinium tetrakis(pentafluor-phenyl)-borate. Mixtures of different co-catalysts can also be used.

The term "polymerization" is to be understood here to mean both homo- and copolymerization of olefins and/or dienes. The following olefins in particular are used for polymerization: $C_2$–$C_{10}$ alkenes such as ethylene, propylene, butene-1, pentene-1 and hexene-1, octene-1, isobutylene, and arylalkenes such as styrene. The following are used in particular as dienes: conjugated dienes such as 1,3-butadiene, isoprene or 1,3-pentadiene, and unconjugated dienes such as 1,4-hexadiene, 1,5-heptadiene, 5,7-dimethyl-1,6-octadiene, 4-vinyl-1-cyclohexene, 5-ethylidene-2-norbornene, 5-vinyl-2-norbornene and dicyclopentadiene.

The catalysts according to the invention are suitable for the production of polyethylene and of ethylene (co)polymers, and are particularly suitable for the production of rubbers based on copolymers of ethylene with one or more of the aforementioned α-olefins and of the aforementioned dienes. The catalysts according to the invention are also suitable for the polymerization of cyclo-olefins such as norbornene, cyclopentene, cyclohexene and cyclooctene, and are suitable for the copolymerization of cycloolefins with ethylene or α-olefins.

Polymerization can be conducted in the liquid phase, in the presence or absence of an inert solvent, or in the gas phase. Suitable solvents include aromatic hydrocarbons such as benzene and/or toluene, or aliphatic hydrocarbons such as propane, hexane, heptane, octane, isobutane, cyclohexane or mixtures of different hydrocarbons.

It is possible to use the catalyst system according to the present invention deposited on a support. Examples of suitable support materials include inorganic or organic polymeric supports, such as silica, zeolites, carbon black, activated carbon, alumina, polystyrene or polypropylene, for example.

The catalysts according to the invention can be deposited on support materials in the customary manner. Methods of supporting catalyst systems are described, for example, in U.S. Pat. No. 4,808,561, 4,912,075, 5,008,228 and 4,914,253.

Polymerization is generally conducted at pressures of 1 to 1000 bar, preferably 1 to 100 bar, and at temperatures of −100 to +250° C., preferably 0 to +150° C. Polymerization can be effected in customary reactors, either continuously or batch-wise.

The invention is explained in greater detail by means of the following examples.

General information: the preparation and handling of organometallic compounds was effected with the exclusion of air and moisture under a protective argon atmosphere (Schlenk technique). All the requisite solvents were rendered absolute before use by boiling for several hours over a suitable drying agent followed by distillation under argon.

Abbreviations

Cp*: $C_5(CH_3)_5$
Fv*: $C_5(CH_3)_4$=$CH_2$
Ph: $C_6H_5$
THF: tetrahydrofurane
MS: mass spectrum
de: excess of diastereomer

EXAMPLE 1

Synthesis of Bis($\eta^5$-pentamethylcyclopentadienyl) zirconiumdiphenyl, [Cp*$_2$ZrPh$_2$], Compound 1

1

3.62 g (8.37 mmoles) bis($\eta^5$-pentamethylcyclopentadienyl)-zirconium dichloride were suspended in 60 ml diethyl ether, the suspension obtained was cooled to −78° C. and 13.90 ml (25.0 mmoles) PhLi were added drop-wise thereto. The batch was then allowed to warm up to room temperature (=25° C.) and was stirred overnight. The suspension was evaporated to dryness under high vacuum and the residue was taken up in 40 ml hexane. This suspension was filtered and the resulting solution was concentrated by evaporation to half its volume, whereupon a white solid was precipitated. The suspension was cooled to −20° C. to effect further crystallization. The solution was decanted and the remaining product was dried under high vacuum. 2.94 g (68%) Cp*$_2$ZrPh$_2$ were obtained.

EXAMPLE 2

Synthesis of η6-(2,3,4,5-tetramethylcyclopentadienyl-1-methylene)(η⁵-pentamethyl-cyclopentadienyl)phenylzirconium, [Cp*Fv*ZrPh], Compound 2

2

4.20 g (8.14 mmoles) Cp*$_2$ZrPh$_2$ were prepared as in Example 1 and were dissolved in 20 ml toluene. The yellow solution was heated at 1110° C. for 6 hours, whereupon the solvent was removed under high vacuum both whilst heating and after cooling. The residue was taken up in a little hexane and was crystallized at −20° C. The mother liquor was decanted and the crystals were dried under high vacuum. 2.56 g (72%) Cp*Fv*ZrPh were obtained as a red crystalline solid.

$^1$H NMR (300 MHz, C$_6$D$_6$): δ=0.93, 1.49, 1.66, 1.76 (s, 3H, C$_5$(CH$_3$)$_4$=CH$_2$), 1.70 (s,. 15H, C$_5$(CH$_3$)$_5$), 2.09, 2.21 (d, 1H, $^3$J(H,H)=6.7 Hz, C$_5$(CH$_3$)$_4$=CH$_2$), 6.00 (d, 1H, $^3$J(H,H)=7.4 Hz, o-C$_6$H$_5$), 6.99–7.18 (m, 4H, C$_6$H$_5$) ppm.

$^{13}$C NMR (75 MHz, C$_6$D$_6$): δ=10.48, 10.49, 11.92, 13.38 (C$_5$(CH$_3$)$_4$=CH$_2$), 11.46 (C$_5$(CH$_3$)$_5$), 63.53 (C$_5$(CH$_3$)$_4$=CH$_2$, 118.13 (C$_5$(CH$_3$)$_5$), 117.68, 119.49, 121.66, 125.56, 128.99 (C$_5$(CH$_3$)$_4$=CH$_2$), 123.09, 125.28, 125.82, 127.02, 134.32, 194.20 (C$_6$H$_5$) ppm.

EXAMPLE 3

Synthesis of Compound 3 Via Reaction of Cp*Fv*ZrPh with Formaldehyde

3

A solution of Cp*Fv*ZrPh from Example 2 (0.080 g, 0.18 mmoles) in 10 ml hexane was treated at room temperature with paraformaldehyde (0.054 g, 1.83 mmoles) and was stirred overnight. After filtering off the unreacted paraformaldehyde, the clear solution was evaporated to dryness. A whitish yellow powder was obtained, which was characterized by NMR and by mass spectrometry (yield: 61% of compound 3).

$^1$H NMR (300 MHz, C$_6$D$_6$): δ=1.41, 1.61 (s, 3H, C$_5$(CH$_3$)$_4$—CH$_2$), 1.74 (s, 15H, C$_5$(CH$_3$)$_5$), 1.75, 1.93 (S. 3H, C$_5$(CH$_3$)$_4$—CH$_2$), 2.42 (ddd, 1H, $^3$J(H,H)=4.40 Hz, $^3$J(H,H)=7.39 Hz, $^2$J(H,H)=13.43 Hz, C$_5$(CH$_3$)$_4$—CHH). 2.47 (ddd, 1H,$^3$J(H,H)=7.39 Hz, $^3$J(H,H)=7.72 Hz, $^2$J(H,H)= 13.43 Hz, C$_5$(CH$_3$)$_4$—CHH), 4.80 (ddd, 1H, $^3$J(H,H)=4.40 Hz, $^3$J(H,H)=7.39 Hz, $^2$J(H,H)=10.41 Hz, OCHHCH$_2$), 5.04 (ddd,1H, $^3$J(H,H)=7.39 Hz, $^3$J(H,H) =7.72 Hz, $^2$J(H,H)= 10.41 Hz, OCHHCH$_2$), 7.05–7.53 (m, 5 H, Zr—C$_6$H$_5$) ppm.

$^{13}$C NMR (75 MHz, C$_6$D$_6$): δ=10.15, 10.95, 11.17 (C$_5$(CH$_3$)$_4$—CH$_2$), 11.33 (C$_5$(CH$_3$)$_5$), 11.77 (C$_5$(CH$_3$)$_4$—CH$_2$), 28.23 (C$_5$(CH$_3$)$_4$—CH$_2$), 82.44 (OCH$_2$CH$_2$), 113.70, 114.57, 115.28 (C$_5$(CH$_3$)$_4$—CH$_2$), 118.48 (C$_5$(CH$_3$)$_5$), 122.66 (C$_5$(CH$_3$)$_4$—CH$_2$), 124.43, 125.98, 127.22 (Zr—C$_6$H$_5$), 134.72 (C$_5$(CH$_3$)$_4$—CH$_2$), 137.20, 139.43 (Zr—C$_6$H$_5$), 190.51 (Zr-ipso-C$_6$H$_5$) ppm.

MS (70eV) m/e (%): 468 (3) [M$^+$], 452 (18) [M$^+$—CH$_3$], 389 (22) [M$^+$-Ph], 359 (2), 40(10), 135 (5) [Cp*], 78(15) [Ph].

EXAMPLE 4

Synthesis of Compound 4 Via Reaction of Cp*Fv*ZrPh with Acetaldehyde

4

The red solution of Cp*Fv*ZrPh from Example 2 (0.130 g, 0.30 mmoles) was reacted in 10 ml hexane at room temperature with 1.2 equivalents acetaldehyde (0.016 g, 0.36 mmoles) and the batch was stirred for 2 hours and was subsequently evaporated to dryness under high vacuum, whereupon a white solid was obtained which was characterized by NMR and by mass spectrometry (100% conversion into compound 4).

$^1$H NMR (300 MHz, C$_6$D$_6$): δ=1.28 (s, 3H, $^3$J(H,H)=6.04 Hz, —OC(H)(CH$_3$)), 1.39, 1.64 (s, 3H, C$_5$(CH$_3$)$_4$—CH$_2$), 1.73 (s, 15H. C$_5$(CH$_3$)$_5$), 1.75, 1.92 (s, 3H, C$_5$(CH$_3$)$_4$—CH$_2$), 2.33 (dd, 1H, $^3$J(H,H)=9.10 Hz, $^2$J(H,H)=13.76 Hz, C$_5$(CH$_3$)$_4$—CHH), 2.47 (dd, 1H, $^3$J(H,H)=6.10 Hz, $^2$J(H,H)=13.76 Hz, C$_5$(CH$_3$)$_4$—CHH), 5.14 (qdd, 1H, $^3$J(H,H)=6.04 Hz, $^3$J(H,H)=6.10 Hz, $^3$J(H,H)=9.10 Hz, —OC(H)(CH$_3$)), 7.05–7.32 (m, 4 H, Zr—C$_6$H$_5$), 7.63 (m, 1 H, Zr-p-C$_6$H$_5$) ppm. $^{13}$C NMR (75 MHz, C$_6$D$_6$): δ=9.90, 10.99 (C$_5$(CH$_3$)$_4$—CH$_2$), 11.16 (C$_5$(CH$_3$)$_5$), 11.17, 12.24 (C$_5$(CH$_3$)$_4$—CH$_2$), 26.40 (—OC(H)(CH$_3$), 36.19 (C$_5$(CH$_3$)$_4$—CH$_2$), 90.62 (—OC(H)(CH$_3$)CH$_2$), 112.67, 113.92, 115.11 (C$_5$(CH$_3$)$_4$—CH$_2$), 118.17 (C$_5$(CH$_3$)$_5$), 123.61 (C$_5$(CH$_3$)$_4$—CH$_2$), 124.50, 126.09, 127.33 (Zr—C$_6$H$_5$), 133.98 (C$_5$(CH$_3$)$_4$—CH$_2$), 136.52, 140.08 (Zr—C$_6$H$_5$), 192.39 (Zr-ipso-C$_6$H$_5$) ppm.

MS (70eV) m/e (%): 480 (5) [M$^+$], 465 (18) {M$^+$—CH,], 403 (20) [M$^+$—Ph], 377 (2), 241 (5), 135 (30) [Cp*], 78 (15) [Ph].

EXAMPLE 5

Synthesis of Compound 5 Via Reaction of Cp*Fv*ZrPh with Benzaldehyde

5

A solution of Cp*Fv*ZrPh from Example 2 (0.145 g, 0.33 mmoles) in 15 ml hexane was treated at room temperature with benzaldehyde (0.035 g, 0.33 mmoles) and the batch was stirred for 15 minutes at room temperature. After removing the solvent under high vacuum, 0.170 g (95%) compound 5 was obtained, and was characterized by NMR and by mass spectrometry.

Figure 1:
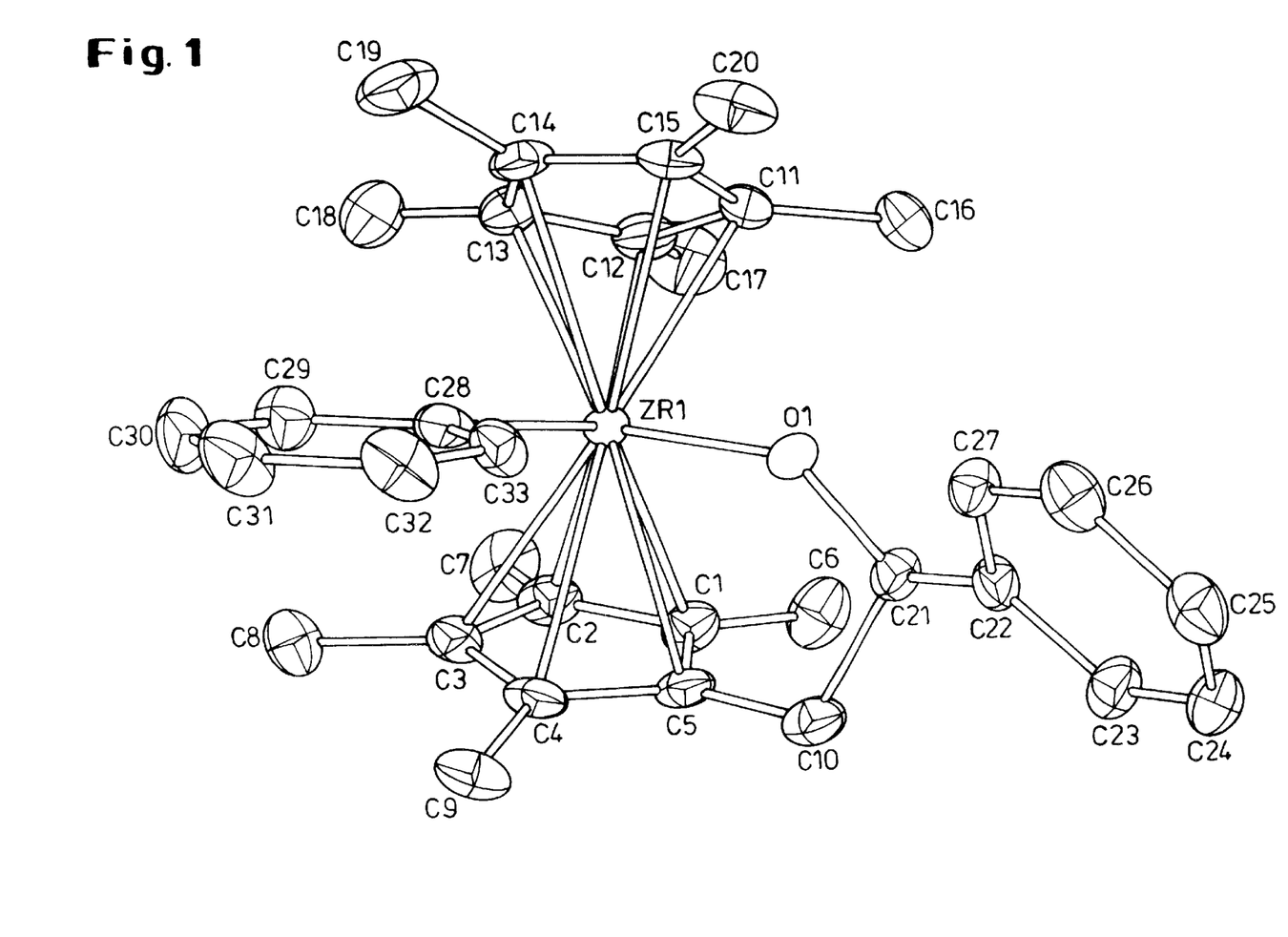
FIG. 1 shows an X-ray structural analysis performed from compound 5 of Example 5.

An X-ray structural analysis was performed from compound 5 (FIG. 1). de: ≧98%

$^1$H NMR (300 MHz, $C_6D_6$): δ=1.30, 1.63 (s, 3H, $C_5(CH_3)_4$—$CH_2$), 1.73 (s, 15H, $C_5(CH_3)_5$), 1.76, 2.02 (s, 3H, $C_5(CH_3)_4$—$CH_2$), 2.69 (dd, 1H, $^3J(H,H)$ =10.41 Hz, $^2J(H,H)$=13.76 Hz, $C_5(CH_3)_4$—$CHH$), 2.89 (dd, 1H, $^3J(H,H)$ =6.04 Hz, $^2J(H,H)$=13.76 Hz, $C_5(CH_3)_4$—$CHH$), 6.11 (dd, 1H, $^3J(H,H)$ =6.04 Hz, $^3J(H,H)$=10.41 Hz, —OC(H)($C_6H_5$)), 7.05–7.75 (m, 10 H, Zr—$C_6H_5$/—OC(H)($C_6H_5$)) ppm.

$^{13}$C NMR (75 MHz, $C_6D_6$): δ=10.18, 11.07 ($C_5(CH_3)_4$—$CH_2$), 11.28 ($C_5(CH_3)_5$), 11.49, 12.31 ($C_5(CH_3)_4$—$CH_2$), 36.77 ($C_5(CH_3)_4$—$CH_2$), 95.80 (—O$C$(H)($C_6H_5$)$CH_2$), 112.83, 115.22, 115.50 ($C_5(CH_3)_4$—$CH_2$), 118.69 ($C_5(CH_3)_5$), 124.18 ($C_5(CH_3)_4$—$CH_2$), 124.74, 125.21 (—OC(H)(m,p-$C_6H_5$)$CH_2$), 126.26, 126.86, 127.70 (Zr—$C_6H_5$), 128.68 (—OC(H)(o-$C_6H_5$)$CH_2$), 133.09 ($C(CH_3)_4$—$CH_2$), 136.61, 139.14 (Zr—$C_6H_5$), 148.52 (—OC(H)(ipso-$C_6H_5$)$CH_2$), 192.35 (Zr-ipso-$C_6H_5$) ppm. MS (70eV) m/e (%): 542 (5) [M$^+$], 527 (20) [M$^+$—CH ], 465 (15) [M$^+$—Ph], 379 (5), 241(8), 135 (10) [Cp*], 78 (10) [Ph].

EXAMPLE 6

Synthesis of Compound 6 Via Reaction of Cp*Fv*ZrPh with Pivalic Aldehyde

6

A solution of Cp*Fv*ZrPh from Example 2 (0.125 g, 0.29 mmoles) in 15 ml hexane was reacted at room temperature with pivalic aldehyde (0.025 g, 0.29 mmoles ). A light yellow solution was obtained immediately. After 15 minutes, this solution was evaporated to dryness, whereupon a yellow solid was obtained which was characterized by NMR and by mass spectrometry (100% conversion into compound 6).

$^1$H NMR (300 MHz, $C_6D_6$): δ=1.03 (s, 9H, —OC(H)(C(C$H_3$)$_3$),1.41, 1.67, 1.69 (s, 3H, $C_5(CH_3)_4$—$CH_2$), 1.72 (s, 15H, $C_5(CH_3)_5$), 1.98 (s, 3H, $C_5(CH_3)_4$—$CH_2$), 2.38 (dd, 1H, $^3J(H,H)$=6.05 Hz, $^2J(H,H)$=13.43 Hz, $C_5(CH_3)_4$—$CHH$), 2.56 (dd, 1H, $^3J(H,H)$=10.74 Hz, $^2J(H,H)$=13.43 Hz, $C_5(CH_3)_4$—$CHH$), 4.69 (dd, 1H, $^3J(H,H)$=6.05 Hz, $^3J(H,H)$=10.74 Hz, OC($H$)(C(CH$_3$)$_3$), 7.14 (m, 2H, Zr-o-$C_6H_5$), 7.28 (m, 2H, Zr-m-$C_6H_5$), 7.61 (m, 1H, Zr-p-$C_6H_5$) ppm.

$^{13}$C NMR (75 MHz, $C_6D_6$): δ=9.95, 111.01 ($C_5(CH_3)_4$—$CH_2$), 11.20 ($C_5(CH_3)_5$), 11.79, 12.38 ($C_5(CH_3)_4$—$CH_2$), 26.84 (C($CH_3$)$_3$), 28.91 ($C(CH_3)_3$), 37.33 ($C_5(CH_3)_4$—$CH_2$), 104.28 (—O$C$(H)(C(CH$_3$)$_3$)CH$_2$), 112.69, 114.99, 115.57 ($C_5(CH_3)_4$—$CH_2$), 118.39 ($C_5(CH_3)_5$),122.76 ($C_5(CH_3)_4$—$CH_2$), 124.65, 126.25, 127.35 (Zr—$C_6H_5$), 134.16 ($C_5(CH_3)_4$—$CH_2$), 136.62, 138.81 (Zr—$C_6H_5$), 191.81 (Zr-ipso-$C_6H_5$) ppm. MS (70eV) m/e (%): 522 (12) [M$^+$], 507 (85) [M$^+$—CH$_3$], 465 [M$^+$—tBu], 445 (80) [M$^+$—Ph], 360 (10), 223 (20), 135 (100) [Cp*], 78 (70) [Ph].

EXAMPLE 7

Synthesis of Compound 7 Via Reaction of Cp*Fv*ZrPh with Acetone

7

A solution of Cp*Fv*ZrPh from Example 2 (0.230 g, 0.52 mmoles) in 20 ml hexane was treated at room temperature with 1.2 equivalents acetone (0.037 g, 6.30 mmoles) and was stirred overnight. It was subsequently evaporated to dryness under high vacuum, whereupon a white solid was obtained which was characterized by NMR and by mass spectrometry (100% conversion into compound 7).

$^1$H NMR (300 MHz, $C_6D_6$): δ=1.37 (s, 3H, —OC(C$H_3$)$_2$), 1.42. 1.62 (s, 3H, $C_5(CH_3)_4$—$CH_2$), 1.72 (s, 3H, —OC(C$H_3$)$_2$), 1.81, 1.85 (s, 3H, $C_5(CH_3)_4$—$CH_2$), 1.87 (s, 15H, C,(C$H_3$)$_5$), 2.27 (d, 1H,$^2J(H,H)$=13.80 Hz, $C_5(CH_3)_4$—$CHH$), 2.42 (d, 1H, $^2J(H,H)$=13.80 Hz, $C_5(CH_3)_4$—CHH), 7.12–7.28 (m, 3 H, Zr-m,p-CC$_6H_5$), 7.65 (m, 2H, Zr-o-$C_6H_5$) ppm. $^{13}$C NMR (75 MHz, $C_6D_6$): δ=11.84 ($C_5(CH_3)_5$), 13.11, 15.10, 15.74, 17.10, ($C_5(CH_3)_4$—$CH_2$), 32.63, 36.16 (—OC($CH_3$)$_2$), 38.89 ($C_5(CH_3)_4$—$CH_2$), 112.13, 114.04, 115.13 ($C_5(CH_3)_4$—$CH_2$), 119.82 ($C_5(CH_3)_5$), 123.07 ($C_5(CH_3)_4$—$CH_2$), 126.65, 127.12 (Zr—$C_6H_5$), 134.28 ($C_5(CH_3)_4$—$CH_2$), 138.52 (Zr—$C_6H_5$), 184.20 (Zr-ipso-$C_6H_5$) ppm. MS (70eV) m/e (%). 494 (2) [M$^+$], 479 (5) [M$^+$—CH$_3$], 417 (20) [M$^+$—Ph], 359 (6), 241 (10), 135 (10) [Cp*], 78 (50) [Ph].

EXAMPLE 8

Synthesis of Compound 8 Via Reaction of Cp*Fv*ZrPh with Acetophenone

8

A solution of Cp*Fv*ZrPh from Example 2 (0.130 g, 0.30 mmoles) in 10 ml hexane was treated at room temperature with acetophenone (0.036 g, 0.30 mmoles). The solution was stirred for 1 hour at room temperature. A pale yellow oil was obtained by distilling off the solvent under high vacuum. Recrystallization from pentane gave 142 g of a solid which was characterized by NMR and by mass spectrometry. (yield: 86% of compound 8).

$^1$H NMR (300 MHz, $C_6D_6$): δ=1.15, 1.55, 1.58, 1.75 (s. 3H, $C_5(CH_3)$4—$CH_2$), 1.78 (s, 15H, $C_5(CH_3)_5$), 2.14 (s, 3H, —OC($CH_3$)($C_6H_5$)), 2.90 (d, 1H, J(H,H)=13.76 Hz, $C_5(CH_3)_4$—CHH), 3.44 (d, 1H, $^2$J(H,H)=13.76 Hz, $C_5(CH_3)_4$ —CHH), 7.00–7.76 (m, 10 H, Zr—$C_6H_5$/—OC($CH_3$)($C_6H_5$)) ppm. $^{13}$C NMR (75 MHz, $C_6D_6$): δ=11.09, 11.53 ($C_5(CH_3)_4$—$CH_2$), 11.65 ($C_5(CH_3)_5$), 12.20, 12.68 ($C_5(CH_3)_4$—$CH_2$), 39.48 ($C_5(CH_3)_4$—$CH_2$), 40.70 (—OC($CH_3$)($C_6H_5$), 105.12 (—OC($CH_3$)($C_6H_5$)$CH_2$), 113.16, 114.79, 119.20 ($C_5(CH_3)_4$—$CH_2$), 118.78 ($C_5(CH_3)_5$), 122.45 ($C_5(CH_3)_4$—$CH_2$), 124.36 (Zr—$C_6H_5$), 125.12 (—OC($CH_3$)(m—$C_6H_5$)$CH_2$), 125.67, 126.43 (Zr—$C_6H_5$), 127.35, 128.57 (—OC($CH_3$)(o,p—$C_6H_5$)$CH_2$), 134.41 ( $C_5(CH_3)_4$—$CH_2$), 136.93, 139.07 (Zr—$C_6H_5$), 153.65 (—OC($CH_3$)(ipso-$C_6H_5$)$CH_2$), 190.65 (Zr-ipso-$C_6H_5$) ppm. MS (70eV) m/e (%): 556 (8) [M$^+$], 54T (20) [M$^+$—$CH_3$], 479 (T2) [M$^+$—Ph], 377 (5), 221(25), 135 (50) [Cp*], 105 (55), 78 (5) [Ph].

EXAMPLE 9

Synthesis of Compound 9 Via Reaction of Cp*Fv*ZrPh with Benzophenone

9

A solution of Cp*Fv*ZrPh from Example 2 (0.1 80 g, 0.41 mmoles) in 20 ml hexane at room temperature was mixed at room temperature with benzophenone (0.075 g, 0.41 mmoles) and after 15 minutes the solution was evaporated to dryness.

A yellow solid was obtained which was characterized by NMR and by mass spectrometry (100% conversion into compound 9).

$^1$H NMR (300 MHz, $C_6D_6$): δ=1.24, 1.58 (s, 3H, $C_5(CH_3)_4$—$CH_2$), 1.68 (s, 15H, $C_5(CH_3)_5$), 1.73, 1.81 (s, 3H, $C_5(CH_3)_4$—$CH_2$), 3.62 (d, 1H, $^2$J(H,H) =14.10 Hz, $C_5(CH_3)_4$ —CHH), 3.84 (d, 1H, $^2$J(H,H)=14.10 Hz, $C_5(CH_3)_4$—CHH), 7.05–7.26 (m, 13 H, Zr—$C_6H_5$/—OC($C_6H_5$)$_2$), 7.67 (m, 2H, —OC($C_6H_5$)$_2$) ppm. $^{13}$C NMR (75 MHz, $C_6D_6$): δ=9.60, 10.08 ($C_5(CH_3)_4$—$CH_2$), 10.31 ($C_5(CH_3)_5$), 10.78, 11.29 ($C_5(CH_3)_4$—$CH_2$), 36.82 ($C_5(CH_3)_4$—$CH_2$), 105.94 (—OC($C_6H_5$)$_2$), 112.36, 114.66, 119.29 ($C_5(CH_3)_4$—$CH_2$), 117.14 ($C_5(CH_3)_5$), 121.87 ( $C_5(CH_3)_4$—$CH_2$),124.36, 124.55 (—OC($C_6H_5$)$_2$), 126.07, 126.50, 126.63 (Zr—$C_6H_5$), 126.93, 127.22, 128.80, 128.96 (—OC($C_6H_5$)$_2$), 132.04 ($C_5(CH_3)_4$—$CH_2$), 134.87, 136.83 (Zr—$C_6H_5$), 151.12, 152.54 (—OC(ipso-$C_6H_5$)$_2$), 189.22 (Zr-ipso-$C_6H_5$) ppm. MS (70eV) m/e (%): 619 (1) [M$^+$], 603 (5) [M$^+$—$CH_3$]541(2) [M$^+$—Ph], 526 (6) [M$^+$—Ph—$CH_3$], 377(15), 439(10), 241(12), 182(65) [$Ph_2CO$], 15 (100) [PhCO], 105 (55), 78 (70) [Ph].

EXAMPLE 10

Synthesis of Compound 10 Via Reaction of Cp*Fv*ZrPh with Ethyl Acetate

10

A solution of Cp*Fv*ZrPh from Example 2 (0.140 g, 0.32 mmoles) in 10 ml hexane was treated at room temperature with ethyl acetate (0.028 g, 0.32 mmoles) and was stirred overnight at room temperature. A yellow solid was obtained by removing the solvent under high vacuum and was characterized by NMR and by mass spectrometry (100% conversion into compound 10).

$^1$H NMR (300 MHz, $C_6D_6$): δ=1.37 (t, 3H, $^3$J(H,H)=7.05 Hz, —OCH$_2$CH$_3$), 1.44, 1.61, 1.66 (s, 3H, $C_5(CH_3)_4$—$CH_2$) 1.71 (s, 15H, $C_5(CH_3)_5$), 1.73 (s, 3H, $C_5(CH_3)_4$—$CH_2$), 1.94 (s,1H, (OC(CH$_3$) (OC$_2$H$_5$), 2.70 (d, 1H, $^2$J(H,H)=14.10 Hz, $C_5(CH_3)_4$—CHH), 3.17 (d, IH, $^2$J(H,H)=14.10 Hz, $C_5(CH_3)_4$ —CHH), 3.52 (qd, 1H, $^2$J(H,H)=1.68 Hz, $^3$J(H,H)=7.05 Hz, —OCHHCH$_3$), 3.73 (qd, 1 H, $^2$J(H,H)=1.34 Hz, J(H,H)=7.05 Hz, —OCHHCH$_3$), 7.05 (d, 1H, $^3$J(H,H) =7.05 Hz, Zr—$C_6H_5$), 718–734 (m, 3 H, Zr—$C_6H_5$), 7.52 (m, 1H, Zr—$C_6H_5$) ppm. $^{13}$C NMR (75 MHz, $C_6D_6$): δ=10.54, 10.95 ($C_5(CH_3)_4$—$CH_2$), 11.37 ($C_5(CH_3)_5$), 11.72, 12.56 ($C_5(CH_3)_4$—$CH_2$), 15.94 (—OCHCH$_3$), 29.68 (OC($CH_3$)(OC$_2$H$_5$), 41.11 ($C_5(CH_3)_4$—$CH_2$), 56.99 (—OCH$_2$CH$_3$), 113.67, 114.69, 117.22 ($C_5(CH_3)_4$—$CH_2$), 118.70 ($C_5(CH_3)_5$), 123.67 ($C_5(CH_3)_4$—$CH_2$), 124.66, 125.42 (Zr—$C_6H_5$), 125.72 (OC(CH$_3$)(OC$_2$H$_5$), 127.16 (Zr—$C_6H_5$), 132.57 ($C_5(CH_3)_4$—$CH_2$), 136.68, 138.32 (Zr—$C_6H_5$), 191.92 (Zr-ipso-$C_6H_5$) ppm. MS (70eV) m/e (%): 478 (15) [M+—OCH₂CH₃], 463 (100) [M+—OCH₂CH₃—CH₃], 401 (85) [M+—OCH₂CH₃—Ph], 359 (5), 223 (12), 135 (10) [Cp*], 78 (20) [Ph].

EXAMPLE 11

Synthesis of Compound 11 Via Reaction of Cp*Fv*ZrPh with Cyclohexyl Isocyanate

A solution of Cp*Fv*ZrPh from Example 2 (0.145 g, 0.33 mmoles) in 10 ml hexane was reacted at room temperature with cyclohexyl isocyanate (0.042 g, 0.33 mmoles) and stirred for 2 hours. The batch was subsequently evaporated to dryness under high vacuum, whereupon a yellow solid was obtained which was characterized by NMR and by mass spectrometry (100% conversion into compound 11). ¹H NMR (300 MHz, C₆D₆): δ=0.87 (m, 4H, C₆H₁₁), 1.04 (m, 2H, C₆H₁₁), 1.23 (s, 3H, C₅(CH₃)₄—CH₂), 1.36 (m, 4H, C₆H₁₁), 1.50, 1.68 (s, 3H, C₅(CH₃)₄—CH₂), 1.69 (s, 15H, C₅(CH₃)₅), 1.71 (s, 3H, C₅(CH₃)₄—CH₂), 3.35 (d, 1H, ²J(H,H)=17.10 Hz, C₅(CH₃)₄—CHH), 3.50 (d, 1H, ²J(H, H)=17.10 Hz, C₅(CH₃)₄—CHH), 3.99 (m, 1H, C₆H₁₁), 6.87 (d, 1 H, Zr—C₆H₅), 7.15 (m, 4 H, Zr—C₆H₅) ppm. ¹³C NMR (75 MHz, C₆D₆): δ=8.27, 9.43 (C₅(CH₃)₄—CH₂), 9.71 (C₅(CH₃)₅), 9.99, 10.21 (C₅(CH₃)₄—CH₂), 24.39, 24.56, 25.31, 33.93, 34.39 (C₆H₁₁), 34.67 (C₅(CH₃)₄—CH₂), 54.21 (ipso-C₆H₁₁), 113.87, 114.78, 116.48 (C₅(CH₃)₄—CH₂), 118.62 (C₅(CH₃)₅), 123.18 (C₅(CH₃)₄—CH₂), 123.61, 125.16, 126.45 (Zr—C₆H₅), 133.40 (C₅(CH₃)₄—CH₂), 134.62, 135.20 (Zr—C₆H₅), 170.63 (—OC=NCy), 191.38 (Zr-ipsoC₆H₅) ppm. MS (70eV) m/e (%): 561(5) [M+], 484 (3) [M+—Ph], 377 (12) [M+—C₆H₁₁NC—Ph], 261(50), 135(100) [Cp*], 78(12) [Ph]

EXAMPLE 12

Polymerization of Ethylene 100 ml toluene were placed in a 250 ml glass reactor, followed by a 0.1 molar solution of triisobutylaluminum in toluene. A solution in 5 ml toluene of 5.6 mg of compound 11 from Example 11 was then added. Ethylene at a pressure of 1.1 bar was subsequently passed continuously into the solution through a gas inlet tube. Polymerization was initiated by adding 2 ml of a solution of triphenylmethyl-tetrakis (pentafluorophenyl) borate in toluene. The reaction, which proceeded at a temperature of 40° C. and at an ethylene pressure of 1.1 bar, was stopped after a duration of polymerization of 5 minutes by adding 10 ml methanol, and the resulting polymer was filtered off, washed with methanol and dried in a vacuum drying oven. 1.2 g polyethylene were obtained.

EXAMPLE 13

Synthesis of Compound 12 Via Reaction of Cp*Fv*ZrPh with Methyl Isothiocyanate A solution of Cp*Fv*ZrPh from Example 2 (0.130 g, 0.30 mmoles) in 10 ml hexane was treated at room temperature with methyl isothiocyanate (0.022 g, 0.30 mmoles) and was stirred for 15 minutes at room temperature. A pale yellow solid was obtained by removing the solvent under high vacuum and was characterized by NMR and by mass spectrometry (100% conversion into compound 12).
¹H NMR (300 MHz, C₆D₆): δ=1.26, 1.56, 1.59, 1.70 (s, 3H, C₅(CH₃)₄—CH₂), 1.72 (s, 15H, C₅(CH₃)₅), 3.36 (d, 3H, ⁴J(H,H)=1.6 Hz, —SC=N—CH₃), 3.66 (dq,1H, ²J(H,H)= 15.80 Hz, ⁴J(H,H)=1.6 Hz, C₅(CH₃)₄—CHH), 3.90 (d, 1H, ²J(H,H)=15.80 Hz, C₅(CH₃)₄—CHH), 6.61 (m, 1 H, Zr—C₆H₅), 7.03 (m, 3 H, Zr—C₆H₅) 7.33 (m, 1H, Zr—C₆H₅) ppm. ¹³C NMR (75 MHz, C₆D₆): δ=11.26, 11.35, 11.47 (C₅(CH₃)₄—CH₂), 11.86 (C₅(CH₃)₅), 12.42 (C₅(CH₃)₄—CH₂), 32.77 (—SC=N—CH₃), 41.31 (C₅(CH₃)₄—CH₂), 116.31, 117.23, 118.97 (C₅(CH₃)₄—C14₂), 120.59 (C₅(CH₃)₅), 120.78 (C₅(CH₃)₄—CH₂), 121.97, 124.97, 126.56 (Zr—C₆H₅), 131.34 (C₅(CH₃)₄—CH₂), 135.21, 140.45 (Zr—C₆H₅), 183.31 (-SC=NCH₃), 196.29 (Zr-ipso-C₆H₅) ppm. MS (70eV) m/e (%): 509 (10) [M+], 494(20) [M+—CH₃], 432 (15) [M+—Ph], 359 (10), 135 (10) [Cp*], 78 (8) [Ph], 73 (100) [SCN—CH₃].

EXAMPLE 14

Synthesis of Compound 13 Via Reaction of Cp*Fv*ZrPh with Pivalic Acid Nitrile

Pivalic acid nitrile (0.25 ml, 2.26 mmoles) was added drop-wise with stirring and at room temperature to a solution of Cp*Fv*ZrPh from Example 2 (0.94 g, 2.14 mmoles) in 60 ml hexane. This solution was kept for one week at room temperature and was subsequently evaporated to dryness, whereupon a yellow solid was obtained which was characterized by NMR spectroscopy. (95% conversion into compound 13).

$^1$H-NMR (500 MHz, $C_6D_6$): δ=1.19 (s, 9H, t-Bu), 1.47 (s, 3H, $CH_3$), (s, 3H, $C_5(CH_3)_4$—$CH_2$), 1.69 (s, 15H, $C_5(CH_3)_5$), 1.90, 1.80, 1.74 (s, 3H, $CH_3$), 4.85 (d, $^4J(H,H)=2$ Hz, 1H, $C_5(CH_3)_4$—CH), 6.68–6.60 (m, 1H, NH), 7.00 (dm, $^3J(H,H)=7$ Hz, 1H, o-Harom.), 7.13 (tt, $^3J(H,H)=7$ Hz, $^4J(H,H)=2$ Hz, 1 H, p-Harom.), 7.23 (tm, 2H, $^3J(H,H)=7$ Hz, 1H, m-Harom.), 7.26 (tm, 2H, $^3J(H,H)=7$ Hz, 1H, m-Harom.), 7.32 (dm, 2H, $^3J(H,H)=7$ Hz, 1H, o-Harom.), ppm. $^{13}$C NMR (75 MHz, $C_6D_6$): δ=9.45 ($C_5(CH_3)_4$—$CH_2$), 11.2 ($C_5(CH_3)_5$), 12.1, 11.7, 11.3 ($C_5(CH_3)_4$—$CH_2$), 29.5 ($C(CH_3)_3$), 34.9 ($C(CH_3)_3$), 90.9 ($C_5(CH_3)_4$—CH), 117.0, 113.7 ($C_5(CH_3)_4$—$CH_2$),117.1 C5($CH_3$)$_5$), 124.2 78 ( $C_5(CH_3)_4$—$CH_2$) 125.8 (pCarom.), 127.7, 127.4 (m-Carom.), 132.9 ($C_5(CH_3)_4$—$CH_2$), 136.4 (o-Carom.), 138.0 ($C_5(CH_3)_4$—$CH_2$), 141.0 (o-Carom.), 174.5 (CN), 192.9 (ipso-Carom.), ppm.

EXAMPLE 15

Polymerization of Ethylene 500 ml toluene, 0.1 ml TIBA and a solution in 2.5 ml toluene of 2.6 mg of compound 13 from Example 14 were placed in a 1.4 liter steel autoclave. This solution was maintained at a controlled temperature of 40° C. Ethylene was then added until the reactor internal pressure rose to 7 bar. Polymerization was initiated by adding a solution of 4.1 mg triphenylmethyl-tetrakis(pentafluorophenyl) borate in 5 ml toluene. After a duration of polymerization of 15 minutes at 40° C. and 7 bar, the autoclave was depressurized, the polymer was filtered off, washed with methanol, isolated and dried under vacuum for 20 hours at 60° C. 7.7 g of polyethylene were obtained.

EXAMPLE 16

Synthesis of Compound 14 Via Reaction of Cp*Fv*ZrPh with 4-Chlorophenyinitrile

14

A solution of Cp*Fv*ZrPh from Example 2 (0.430 g, 0.98 mmoles) in 25 ml hexane was reacted at room temperature with 4-chlorophenyinitrile (0.135 g, 0.98 mmoles). The solution was kept for 3 days at room temperature and was subsequently evaporated to dryness, whereupon an orange solid was obtained which was characterized by NMR and by mass (100% conversion into compound 14).

$^1$H NMR (300 MHz, $C_6D_6$): δ=1.48 (s, 314, $C_5(CH_3)_4$—$CH_2$),1.65 (s, 15H, $C_5(CH_3)_5$), 1.72, 1.77, 1.93 (s, 3H, $C_5(CH_3)_4$—$CH_2$), 5.23 (d. 1H, $^4J(H,H)=2.35$ Hz, —CH=CN—), 6.60 (m, 1H, NH), 6.96–7.38 (m, 5 H, Zr—$C_6H_5$), 7.14 (d, 2H, $^3J(H,H)=8.3$ Hz, $C_6H_4Cl$), 7.35 (d, 2H, $^3J(H,H)=8.3$ Hz, $C_6H_4Cl$), ppm. $^{13}$C NMR (75 MHz, $C_6D_6$): δ=9.75, 11.38 ($C_5(CH_3)_4$—$CH_2$),11.44 ($C_5(CH_3)_5$), 11.84, 12.40 ($C_5(CH_3)_4$—$CH_2$), 95.86 (—CH=CN—), 114.40, 117.67 ($C_5(CH_3)_4$—$CH_2$), 117.84 ($C_5(CH_3)_5$), 122.22, 123.37 ($C_5(CH_3)_4$—$CH_2$), 124.57, 126.07 (Zr—$C_6H_5$), 126.90 ($C_6H_4Cl$), 128.93 (Zr—$C_6H_5$), 129.04, 133.61 ( $C_6H_4Cl$), 136.39 (Zr—$C_6H_5$), 137.30 ($C_6H_4Cl$), 138.78 ( $C_5(CH_3)_4$—$CH_2$), 141.00 (Zr—$C_6H_5$), 163.72 (—CH=CN—), 193.26 (Zr-ipso-$C_6H_5$), ppm.

EXAMPLE 17

Polymerization of Ethylene 100 ml toluene were placed in a 250 ml glass reactor, followed by a 0.1 molar solution of triisobutylaluminum in toluene. A solution in 5 ml toluene of 5.8 mg of the orange solid from Example 16 was then added. Ethylene at a pressure of 1.1 bar was subsequently passed continuously into the solution through a gas inlet tube and the solution was stirred for 5 minutes at 40° C. Polymerization was initiated by adding 2 ml of a 0.005 molar solution of triphenylmethyl-tetrakis(pentafluorophenyl) borate in toluene. The reaction, which proceeded at a temperature of 40° C. and at an ethylene pressure of 1.1 bar, was stopped after a duration of polymerization of 10 minutes by adding 10 ml methanol, and the resulting polymer was filtered off, washed with methanol and dried in a vacuum drying oven. 2.14 g polyethylene were obtained.

EXAMPLE 18

Synthesis of Compound 15 Via Reaction of Cp*Fv*ZrPh with (2,6)-dimethyl-phenyl Isonitrile

15

A solution of Cp*Fv*ZrPh from Example 2 (0.120 g, 0.27 mmoles) in 10 ml hexane was treated at room temperature with (2,6)-dimethyl-phenyl isonitrile (0.036 g, 0.27 mmole) and was stirred overnight. The solution was separated by means of a syringe and the remaining orange solid was dried under high vacuum and was subsequently investigated by NMR spectroscopy. (yield: 44% of compound 15)

$^1$H NMR (300 MHz, $C_6D_6$): δ=1.25, 1.42 (s, 3H, $C_5(CH_3)_4$—$CH_2$), 1.56 (s, 3H, —C=N—$C_6H_3(CH_3)_2$), 1.63, 1.68 (s, 3H, $C_5(CH_3)_4$—$CH_2$), 1.80 (s, 15H, $C_5(CH_3)_5$), 2.24, 2.30, 2.63 (s, 3H, —C=N—$C_6H_3(CH_3)_2$), 2.82 (d,1H, $^2J(H,H)=15.70$ Hz, $C_5(CH_3)_4$—CHH), 2.90 (d, 1H, $^2J(H,H)=15.70$ Hz, $C_5(CH_3)_4$—CHH), 6.98–7.24 (m, 9H, Zr—$C_6H_5$/—C=N—$C_6H_3(CH_3)_2$),), 7.84 (m, 2H, —C=N—$C_6$

H$_3$(CH$_3$)$_2$) ppm. $^{13}$C NMR (75 MHz, C$_6$D$_6$): δ=10.13, 10.95, 11.70 (C$_5$(CH$_3$)$_4$—CH$_2$), 11.88 (C$_5$(CH$_3$)$_5$), 13.26 (C$_5$(CH$_3$)$_4$—CH$_2$), 17.94, 19.53, 20.65, 21.48 (—C═N—C$_6$H$_3$(CH$_3$)$_2$), 27.30 (C$_5$(CH$_3$)$_4$—CH$_2$), 113.87, 116.88 ( C$_5$(CH$_3$)$_4$—CH$_2$), 120.66 (C$_5$(CH$_3$)$_5$), 120.95 ( C$_5$(CH$_3$)$_4$—CH$_2$), 122.05, 123.72 (Zr—C$_6$H$_5$), 123.91 ( C$_5$(CH$_3$)$_4$—CH$_2$), 125.36 (Zr—C$_6$H$_5$), 127.05, 127.63, 128.37. 128.69.128.72 (—C═N—C$_6$H$_3$(CH$_3$)$_2$), 129.47 (Zr—C$_6$H$_5$), 134.67 (C$_5$(CH$_3$)$_4$—CH$_2$), 135.77 (Zr—C$_6$H$_5$), 147.37, 154.84 (—C═N-ipso-C$_6$H$_3$(CH$_3$)$_2$), 178.28 (—C═N—), 197.38 (Zr-ipso-C$_6$H$_5$), 235.17 (Zr—C═N—) ppm.

EXAMPLE 19

Synthesis of a Fulvene Complex by the Reaction of 6,6-Dimethylfulvene with Cp*TiCl$_3$ in the Presence of Magnesium [(C$_5$(CH$_3$)$_5$) (C$_5$H$_4$)C(CH$_3$)$_2$TiCl], Compound 16

16

Cp*TiCl$_3$ (0.610 g, 2.11 mmoles) and 1.05 equivalents magnesium (0.054 9, 2.21 mmoles) were placed in a vessel in 25 ml THF. 1.05 equivalents 6,6-dimethylfulvene (0.227 g, 2.14 mmoles) were added drop-wise at room temperature to this solution. The batch was left overnight at room temperature with stirring, so that all the Mg was consumed. The solvent was removed under high vacuum and the residue was taken up in hexane. The magnesium chloride was filtered off and the solution was evaporated to half its volume, whereupon green, lustrous platelets were obtained. The batch was cooled to −20° C. to crystallize out the solid. The olive green crystals were isolated and dried under high vacuum. 0.429 g (59%) [(C$_5$(CH$_3$)$_5$)(C$_5$H$_4$) C(CH$_3$)$_2$TiCl] was obtained.

$^1$H NMR (C$_6$D$_6$, 300 MHz): δ=1.16 (s, 3H, C(CH$_3$)$_2$),1.70 (5, 15 H, C$_5$(CH$_3$)$_5$), 1.75 (s, 3H, C(CH$_3$)$_2$), 3.43, 4.65, 6.03, 6.70 (m, 1H, C$_5$H$_4$) ppm. $^{13}$C NMR (C$_6$D$_6$, 75 MHz): δ=12.82 (C$_5$(CH$_3$)$_5$), 22.76, 24.50 (C(CH$_3$)$_2$), 108.10 ( C(CH$_3$)$_2$) 117.23, 117.46, 120.04, 124.09 (C$_4$H$_4$), 122.55 (C$_5$(CH$_3$)$_5$), 132.16 (ipsoC$_5$H$_4$) ppm. MS (70eV) m/e (%): 324 (40) [M$^+$]288 (40) [M$^+$—Cl, 135 (5) [Cp*], 106 (100) [dimethylfulvene].

EXAMPLE 20

Synthesis of a Fulvene Complex by the Reaction of 6,6-Dimethylfulvene with Cp*ZrCl$_3$ in the Presence of Magnesium [C$_5$(CH$_3$)$_5$) (C$_5$H$_4$)C(CH$_3$)$_2$ZrCl], Compound 17

17

Cp*ZrCl$_3$ (0.380 g, 1.14 mmoles) and 1.1 equivalents magnesium (0.031 g, 1.26 mmoles) were placed in a vessel in 10 ml THF. 1.1 equivalents 6,6-dimethylfulvene (0.134 g, 1.26 mmoles) were added drop-wise to this solution. The batch was left overnight with stirring, so that the magnesium dissolved completely. The batch was evaporated to dryness under high vacuum, taken up in 10 ml hexane and was filtered from the magnesium chloride formed. After drying under high vacuum, 197 mg (47%) [(C$_5$(CH$_3$)$_5$)(C$_5$H$_4$)C (CH$_3$)$_2$ZrCl] were obtained as a brownish-red solid.

$^1$H NMR: (C$_6$D$_6$, 300 MHz): δ=1.77 (s, 15H, C$_5$(CH$_3$)$_5$), 1.98, 1.99 (s, 3H, C(CH$_3$)$_2$), 5.40 (dd, 1H, $^3$J(H,H)=2.69, 3.02 Hz, C$_5$H$_4$), 5.58 (dd,1H, $^3$J(H,H)=2.69, 2.68 Hz, C$_5$H$_4$), 5.85 (dd,1H, $^3$J(H,H)=2.68, 3.02 Hz, C$_5$H$_4$), 5.92 (dd,1H, $^3$J=2.69, 2.68 Hz, C$_5$H$_4$) ppm. $^{13}$C NMR: (C$_6$D$_6$, 75 MHz): δ=10.98 (C$_5$(CH$_3$)$_5$), 21.35, 21.90 (C(CH$_3$)$_2$), 109.78 ( C(CH$_3$)$_2$), 107.75, 110.68, 113.88, 118.11 (C$_5$H$_4$), 115.69 (ipso-C$_5$H$_4$), 122.35 (C$_5$(CH$_3$)$_5$) ppm. MS (70eV) m/e (%): 366 (10) [M$^+$], 330 (5) [M$^+$—HCl], 259 (2), 135 (5) [Cp*], 106 (100) [dimethylfulvene].

EXAMPLE 21

Synthesis of a Fulvene Complex by the Reaction of 6,6-Dimethylfulvene with CpTiCl$_3$ in the Presence of Magnesium [(C$_5$H$_5$)(C$_5$H$_4$)C(CH$_3$)$_2$TiCl], Compound 18

18

CpTiCl$_3$ (0.410 g, 1.87 mmoles) and 1.05 equivalents magnesium (0.048 g, 1.96 mmoles) were placed in a vessel in 20 ml THF. 1.03 equivalents 6,6-dimethylfulvene (0.204 g, 1.92 mmoles) were added drop-wise at room temperature to this solution. The magnesium used was consumed after 3 hours. The batch was subsequently concentrated by evaporation under high vacuum and taken up in 20 ml hexane. After filtering off the solid, the solution was evaporated to half its volume under high vacuum. 0.2 g (42%) [(C$_5$H$_5$)(C$_5$H$_4$)C (CH$_3$)$_2$TiCl] was obtained as a dark green solid by crystallization at −20° C. $^1$H NMR: (C$_6$D$_6$, 300 MHz): δ=0.94, 1.64 (s, 3H, C(CH$_3$)$_2$), 3.66 (m, 1H, C$_5$H$_4$), 4.76 (m, 1H, C$_5$H$_4$), 5.80 (s, 5H, C$_5$H$_5$), 6.23 (m, 1H, C$_5$H$_4$), 6.66 (m, 1H, C$_5$H$_4$) ppm $^{13}$C NMR: (C$_6$D$_6$, 75 MHz): δ=10.98 (C$_5$(CH$_3$)$_5$), 21.35, 21.90 (C(CH$_3$)$_2$), 109.78 (C(CH$_3$)$_2$), 107.75 110.68, 113.88, 118.11 (C$_5$H$_4$), 115.69 (ipso-C$_5$H$_4$), 122.35 (C$_5$(CH$_3$)$_5$) ppm.

EXAMPLE 23

Synthesis of a Fulvene Complex by the Reaction of 6,6-Diphenylfulvene with Cp*TiCl$_3$ in the Presence of Magnesium [(C$_5$(CH$_3$)$_5$)(C$_5$H$_4$) C(C$_6$H$_5$)$_2$TiCl], Compound 19

19

Cp*TiCl$_3$ (0.690 g, 2.38 mmoles) and 1.1 equivalents magnesium (0.064 g, 2.62 mmoles) were placed in a vessel in 20 ml THF. 1.1 equivalents 6,6-diphenylfulvene (0.604 g, 2.62 mmoles) were added drop-wise at room temperature to this solution. The batch was left overnight at room temperature with stirring, so that all the magnesium was consumed. The solvent was removed under high vacuum and the residue was taken up in hexane. The solid was filtered off and the solution was concentrated to half its volume. The batch was cooled −20° C. to effect crystallization, whereupon 0.29 g (27%) [(C$_5$(CH$_3$)$_5$) (C$_5$H$_4$)C(C$_6$H$_5$)$_2$TiCl] was obtained a a green solid.

$^1$H NMR:(C$_6$D$_6$, 300 MHz): δ=1.55 (s, 15 H, C$_5$(CH$_3$)$_5$), 4.20, 4.55, 5.89, 6.37 (m, 1H, C$_5$H$_4$), 6.89–7.41 (m, 10H, C$_6$H$_5$) ppm. $^{13}$C NMR:(C$_6$D$_6$, 75 MHz): δ=12.38 (C$_5$(CH$_3$)$_5$), 116.29, 117.24, 118.22, 121.82 (C$_4$H$_4$), 124.04 (C$_5$(CH$_3$)$_5$), 125.61 (ipso-C$_5$H$_4$), 126.50, 126.84, 127.26, 128.07, 128.83, 129.81 (C$_6$H$_5$), 130.72 (—C(C$_6$H$_5$)), 141.93, 144.23 (ipso-C$_6$H$_5$) ppm. MS (70eV) m/e (%): 448 (5) [M$^+$], 413 (2) [M$^+$—HCl], 230 (100) [6,6-di-phenylfulvene], 135(15) [Cp*], 78 (12) [Ph].

EXAMPLE 24

Synthesis of a Fulvene Complex by Reaction of 6, 6-Diphenylfulvene with Cp*ZrCl$_3$ in the Presence of Magnesium [(C$_5$(CH$_3$)$_5$)(C$_5$H$_4$)C(C$_6$H$_5$)$_2$ZrCl], Compound 20

20

Cp*ZrCl$_3$(0.310 g, 0.93 mmoles) and 1.05 equivalents magnesium (0.024 g, 0.98 mmoles) were placed in a vessel in 10 ml THF. 1.05 equivalents 6,6-diphenylfulvene (0.225 g, 0.98 mmoles) were added drop-wise to this solution. The batch was left overnight with stirring, so that the magnesium reacted completely. The batch was evaporated to dryness under high vacuum, taken up in 20 ml toluene and the solid was filtered off. After covering with hexane at −20° C., 178 mg (39%) [(C$_5$(CH$_3$)$_5$)(C$_5$H$_4$) C(C$_6$H$_5$)$_2$ZrCl] were obtained as a red solid.

$^1$H NMR:(C$_6$D$_6$, 300 MHz): δ=1.63 (s, 15 H, C$_5$(CH$_3$)$_5$), 4.65, 5.20, 5.22, 6.06 (m, 1H, C$_5$H$_4$), 6.98–7.16 (m, 8H, C$_6$H$_5$), 7.26–7.49 (m, 2H, C$_6$H$_5$) ppm. $^{13}$C NMR:(C$_6$D$_6$, 75 MHz): δ=11.66 (C$_5$(CH$_3$)$_5$), 104.67, 111.14, 113.62. 117.52 (C$_4$H$_4$), 120.82 (C$_5$(CH$_3$)$_5$), 125.61 (ipso-C$_5$H$_4$), 126.50, 126.84, 127.26, 128.07,128.83, 129.81 (C$_6$H$_5$), 130.72 (—C(C$_6$H$_5$)), 141.93,144.23 MS (70eV) m/e (%): 448 (5) [M$^+$], 413 (2) [M$^+$—HCl], 230 (100) [6,6-di-phenylfulvene], 135 (15) [Cp*], 78 (12) [Ph].

EXAMPLE 25

Synthesis of a Fulvene Complex by the Reaction of 2,3,4,5-Tetramethylfulvene with Cp*TiCl$_3$ in the Presence of Magnesium [(C$_5$(CH$_3$)$_5$)(C$_5$(CH$_3$)$_4$)CH$_2$TiCl], Compound 21

21

Cp*TiCl$_3$ (0.370 g, 1.28 mmoles) and 1.05 equivalents magnesium (0.033 g, 1.35 mmoles) were placed in a vessel in 25 ml THF. 1.05 equivalents 2,3,4,5-tetramethylfulvene (0.185 g, 1.35 mmoles) were added drop-wise at room temperature to this solution. The batch was left overnight at room temperature with stirring, so that all the Mg was consumed. The solvent was removed under high vacuum and the residue was taken up in hexane. The solid was filtered off and the solution was evaporated to half its volume. The batch was cooled to −20° C. for crystallization, whereupon 0.23 g (52%) [(C$_5$(CH)$_3$)$_5$)(C$_5$(CH$_5$)$_4$)CH$_2$TiCl] was obtained as a green solid.

$^1$H NMR:(C$_6$D$_6$, 300 MHz): δ=1.21, 1.47, 1.70 (s, 3 11. C$_5$(CH$_3$)$_4$=CH$_2$), 1.79 (s, 3 H, C$_5$(CH$_3$)$_5$), 2.07 (s, 3 H, C$_5$(CH$_3$)$_4$=CH$_2$), 1.43 (d, 1H, $^2$J(H,H)=3.66 Hz, C$_5$(CH$_3$)$_4$=CHH), 2.54 (d,1 H, $^2$J(H,H)=3.66 Hz, C$_5$(CH$_3$)$_4$=CHH) ppm. $^{13}$C NMR:(C$_6$D$_6$, 75 MHz): δ=9.82, 10.22 (C$_5$(CH$_3$)$_4$=CH$_2$), 11.13 (C$_5$(CH$_3$)$_5$), 11.85, 14.00 (C$_5$(CH$_3$)$_4$=CH$_2$), 77.65 (C$_5$(CH$_3$)$_4$=CH$_2$), 120.08 (C$_5$(CH$_3$)$_5$), 120.32, 124.43, 124.73, 128.61, 135.17 ( C$_5$(CH$_3$)$_4$=CH) ppm.

EXAMPLE 26

Synthesis of a Fulvene Complex by the Reaction of 2,3,4,5-Tetramethylfulvene with CpTiCl$_3$ in the Presence of Magnesium [(C$_5$H$_5$)(C$_5$(CH$_3$)$_4$)CH$_2$TiCl], Compound 22

22

CpTiCl$_3$ (0.350 g, 1.60 mmoles) and 1.05 equivalents magnesium (0041 g, 1.67 mmoles) were placed in a vessel in 20 ml THF. 1.1 equivalents 2,3,4,5-tetramethylfulvene (0.260 g, 1.67 mmoles) were added drop-wise at room temperature to this solution. The magnesium used was consumed after 3 hours. The batch was subsequently evaporated under high vacuum and taken up in 20 ml hexane. After filtering off the solid, the dark green solution was evaporated to half its volume under high vacuum. 0.3 g (67%) [(C$_5$H$_5$)(C$_5$(CH$_3$)$_4$)CH$_2$TiCl] was obtained as a dark green solid by crystallization at −20° C.

$^1$H NM:(C$_6$D$_6$, 300 MHz):δ=0.82, 1.27, 1.74 (s, 3 H, C$_5$(CH$_3$)$_4$=CH$_2$), 1.99 (d, 1H, $^2$J(H,H)=3.7 Hz, C$_5$(CH$_3$)$_4$=CHH), 2.05 (s, 3 H, C$_5$(CH$_3$)$_4$=CH$_2$), 2.56 (d, 1 H, $^2$J(H,H)=3.7 Hz, C$_5$(CH$_3$)$_4$=CHH), 5.77 (s, 5H, C$_5$H$_5$) ppm. $^{13}$C NMR: (C$_6$D$_6$, 75 MHz): δ=9.47, 10.35, 12.01, 12.95 (C$_5$(CH$_3$)$_4$=CH$_2$), 74.47 (C$_5$(CH$_3$)$_4$=CH$_2$), 110.80 ( C$_5$H$_5$), 119.92, 124.60, 127.82, 129.43, 134.80 (Chd 5(CH$_3$)$_4$=CH$_2$) ppm. MS (70eV) m/e (%): 283 (10) [M$^+$], 247 (15) [M$^+$—HCl], 134 (50) [2,3,4,5-tetramethylfulvene], 119 (100) [2,3,4,5-tetramethylfulvene-CH$_4$], 65 (30) [Cp].

EXAMPLE 27

Synthesis of a Fulvene Complex by the Reaction of 1,2,3,4,6-pentamethylfulvene with CpTiCl$_3$ in the Presence of Magnesium [(C$_5$H$_5$)(C$_5$(CH$_3$)$_4$)C(H)(CH$_3$)TiCl], Compound 23

23

CpTiCl$_3$ (0.450 g, 2.05 mmoles) and 1.05 equivalents magnesium (0.054 g, 2.15 mmoles) were placed in a vessel in 20 ml THF. 1.03 equivalents 1,2,3,4,6-pentamethylfulvene (0.320 g, 2.15 mmoles) were added drop-wise at room temperature to this solution. The magnesium used was consumed after 3 hours. The batch was subsequently evaporated under high vacuum and taken up in 20 ml hexane. After filtering off the solid, the solution was evaporated to half its volume under high vacuum. 0.17 g (28%) [(C$_5$H$_5$)(C$_5$(CH$_3$)$_4$)C(H)(CH$_3$)TiCl] was obtained as a dark green solid by crystallization at −20° C. de: 25%

$^1$H NMR: (C$_6$D$_6$, 300 MHz): δ=0.73, 1.12 (s, 3 H, C$_5$(CH$_3$)$_4$=C(CH$_3$)(H)), 1.64 (d, 3H, $^3$J(H,H)=7.25 Hz, C$_5$(CH$_3$)$_4$ =C(CH$_3$)(H)), 1.71 (s, 3 H, C$_5$(CH$_3$)$_4$=C(CH$_3$)(H)), 2.29 (q, 1H, $^3$J(H,H)=7.25 Hz, C$_5$(CH$_3$)$_4$=C(CH$_3$)(H)), 2.55 (s, 3H, C$_5$(CH$_3$)$_4$=C(CH$_3$)(H)), 5.79 (s, 5H, C$_5$H$_5$) ppm. $^{13}$C NMR: (C$_6$D$_6$, 75 MHz): δ=10.87, 13.35, 16.19, 16.97 (C$_5$(CH$_3$)$_4$=C(CH$_3$)(H)), 37.62 (C$_5$(CH$_3$)$_4$=C(CH$_3$)(H)), 94.39 (C$_5$(CH$_3$)$_4$=C(CH$_3$)(H)), 112.02 (C$_5$H$_5$), 121.46, 125.56, 130.91, 131.46, 136.90 (C$_5$(CH$_3$)$_4$=C(CH$_3$)(H)) ppm.

EXAMPLE 28

Synthesis of a Fulvene Complex by the Reaction of 6-Tert.-butylfulvene with Cp*TiCl$_3$ in the Presence of Magnesium [(C$_5$(CH$_3$)$_5$)(C$_5$H$_4$)) C(H)(C(CH$_3$)$_3$)TiCl], Compound 24

24

Figure 2:
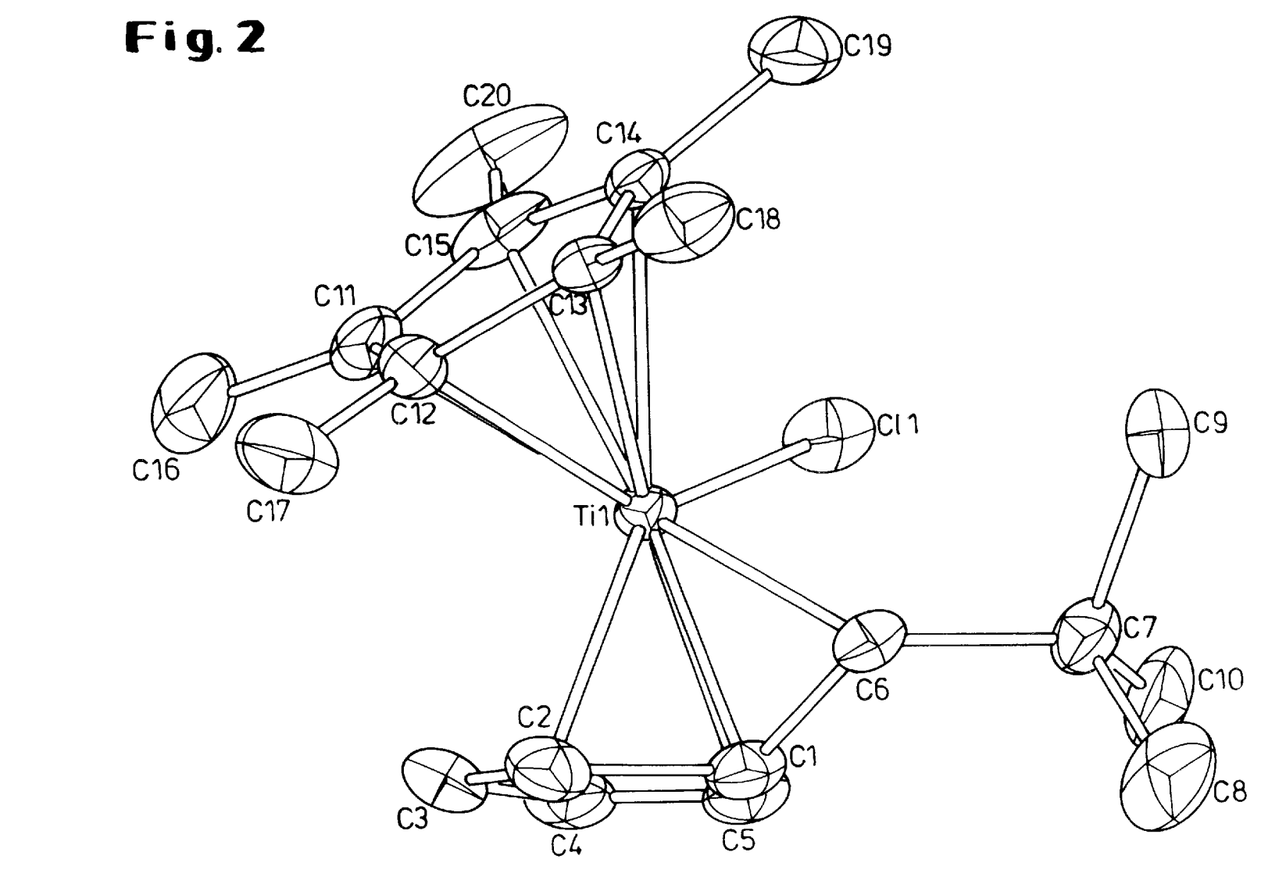
FIG. 2 shows An X-ray structural analysis performed from compound 24 in Example 28.

Cp*TiCl$_3$ (0.450 g, 1.55 mmoles) and 1.05 equivalents magnesium (0.039 g, 1.63 mmoles) were placed in a vessel in 15 ml THF. 1.05 equivalents tert.-butylfulvene (0.249 g, 1.63 mmoles) were added drop-wise at room temperature to this solution. The batch was left overnight at room temperature with stirring, so that all the magnesium was consumed. The solvent was removed under high vacuum and was taken up in hexane. The solid was filtered off and the solution was evaporated to half its volume. The batch was cooled to −20° C. for crystallization, whereupon 0.35 g (64%) [(C$_5$(CH$_3$)$_5$)(C$_5$H$_4$)) C(H)(C(CH$_3$)$_3$)TiCl] was obtained as green crystals. An X-ray structural analysis was performed from compound 24 (FIG. 2).

de: ≧98% $^1$H NMR:(C$_6$D$_6$, 300 MHz): δ=1.16 (s, 9H, C$_5$H$_4$=C(H)(C(CH$_3$)$_3$)), 1.68 (s, 1H, C$_5$H$_4$=C(H)(C(CH$_3$)$_3$)), 1.70 (s, 15H, C$_5$(CH$_3$)$_5$), 3.15, 4.74, 5.97, 6.63 (m, 1H, C$_5$H$_4$=C(H)(C(CH$_3$)$_3$),) ppm. $^{13}$C NMR: (C$_6$D$_6$, 75 MHz): δ=11.69 (C$_5$(CH$_3$)$_5$), 32.20 (C$_5$H$_4$=C(H)(C(CH$_3$)$_3$)), 34.28 (C$_5$H$_4$=C(H)(C(CH$_3$)$_3$)), 114.31 (C$_5$H$_4$=C(H)(C(CH$_3$)$_3$)), 117.83, 118.31, 118.77 ( C$_5$H$_4$=C(H)(C(CH$_3$)$_3$)), 120.46 (C$_5$(CH$_3$)$_5$), 124.72, 128.23 (C$_5$H$_4$=C(H)(C(CH$_3$)$_3$)) ppm. MS (70eV) m/e (%): 353 (12) [M$^+$]316(5) [M$^+$—HCl], 270(18), 235 (8), 135 (100) [Cp*], 119 (35), 80 (85), 57 (90) [C(CH$_3$)$_3$].

EXAMPLE 29

Synthesis of a Fulvene Complex by the Reaction of 6-Tert.-butyl Fulvene with CpTiCl$_3$ in the Presence of Magnesium [(C$_5$H$_5$) (C$_5$H$_4$)C(H)(C(CH$_3$)$_3$)TiCl], Compound 25

CpTiCl$_3$ (0.420 g, 1.91 mmoles) and 1.05 equivalents magnesium (0.048 g, 2.01 mmoles) were placed in a vessel in 10 ml THF. 1.03 equivalents tert.-butylfulvene (0.295 9,1.91 mmoles) were added drop-wise to this solution at room temperature. The magnesium used was consumed after 3 hours. The batch was subsequently evaporated under high vacuum and taken up in 20 ml hexane. After filtering off the solid, the solution was evaporated to half its volume under high vacuum. 0.23 g (44%) [(C$_5$H$_5$)(C$_5$H$_4$) C(H)(C(CH$_3$)$_3$) TiCl] were obtained as dark green crystals by crystallization at −20° C.

de: ≧98% $^1$H NMR:(C$_6$D$_6$, 300 MHz): δ=1.05 (s, 9H, C$_5$H$_4$=C(H)(C(CH$_3$)$_3$)), 2.05 (s, 1 H C$_5$H$_4$=C(H)(C(CH$_3$)$_3$)), 3.28, 4.83 (m, 1H, C$_5$H$_4$=C(H)(C(CH$_3$)$_3$)),) 5.85 (s, 5H, C$_5$H$_5$), 6 17, 6.59 (m, 1H, C$_5$H$_4$=C(H)(C(CH$_3$)$_3$)),) ppm. $^{13}$C NMR: (C$_6$D$_6$, 75 MHz): δ=32.84 (C$_5$H$_4$=C(H)(C(CH$_3$)$_3$)), 35.76 (C$_5$H$_4$=C(H)(C(CH$_3$)$_3$)), 111.23 (C$_5$H$_5$), 111.63 (C$_5$H$_4$=C(H)(C(CH$_3$)), 116.62, 117.41, 121.63, 127.65, 127.50 ( C$_5$H$_4$=C(H)(C(CH$_3$)$_3$)), ppm. MS (70eV) m/e (%): 282 (5) [M$^+$], 246 (45) [M$^+$—HCl], 228 (15), 135 (10) [Cp*], 119 (35).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A catalyst system prepared by
 a) a fulvene cyclopentadienyl metal complex of formula (I)

wherein
 M is a metal of the group comprising titanium, zirconium and hafnium,
 A denotes a cyclopentadienyl of formula C$_5$H$_q$R$^7_{5-q}$, where q represents 0, 1, 2, 3, 4 or 5; or an indenyl of formula C$_9$H$_{7-r}$R$^7_r$, where r represents 0, 1, 2, 3, 4, 5, 6 or 7; or a fluorenyl of formula C$_{13}$H$_{9-p}$R$^7_p$, where p represents 0, 1, 2, 3, 4, 5, 6, 7 or 8,
 X denotes a hydrogen atom, a C$_1$ to C$_{10}$ alkyl group, a C$_1$ to C$_{10}$ alkoxy group, a C$_6$ to C$_{10}$ aryl group, a C$_6$ to C$_{10}$ aryloxy group, a C$_2$ to C$_{10}$ alkenyl group, a C$_7$ to C$_{40}$ arylalkyl group, a C$_7$ to C$_{40}$ alkylaryl group, a C$_8$ to C$_{40}$ arylalkenyl group, a halogen atom or an amide of formula NR$^7_2$,
 R$^1$, R$^2$, R$^3$, R$^4$, R$^5$, and R$^6$ are the same or different and represent hydrogen, a halogen, a cyano group, a C$_1$ to C$_{20}$ alkyl group, a C$_1$ to C$_{10}$ fluoroalkyl group, a C$_6$ to C$_{10}$ fluoroaryl group, a C$_1$ to C$_{10}$ alkoxy group, a C$_6$ to C$_{20}$ aryl group, a C$_6$ to C$_{10}$ aryloxy group, a C$_2$ to C$_{10}$ alkenyl group, a C$_7$ to C$_{40}$ arylalkyl group, a C$_7$ to C$_{40}$ alkylaryl group, a C$_8$ to C$_{40}$ arylalkenyl group, a C$_2$ to C$_{10}$ alkynyl group, a silyl group substituted by C$_1$–C$_{10}$ hydrocarbon radicals, a sulphide group substituted by a C$_1$–C$_{10}$ hydrocarbon radical, or an amino group which is optionally substituted by C$_1$–C$_{20}$ hydrocarbon radicals, or
 R$^1$, R$^2$, R$^3$, R$^4$, R$^5$, and R$^6$ each form one or more aliphatic or aromatic ring systems together with the atoms which bond them, which ring systems may contain one or more hetero atoms (O, N, S) and comprise 5 to 10 carbon atoms,
 R$^7$ represents hydrogen, a C$_1$ to C$_{20}$ alkyl group, a C$_6$ to C$_{20}$ aryl group, a C$_7$ to C$_{40}$ arylalkyl group, a C$_7$ to C$_{40}$ alkylaryl group, a silyl group which is substituted by C$_1$–C$_{10}$ hydrocarbon radicals, or an amino group which is optionally substituted by C$_1$–C$_{20}$ hydrocarbon radicals,
and
 b) an unsaturated compound of formula (II):

(II), wherein
 R$^8$ and R$^9$ are the same or different, and denote a hydrogen atom, a halogen atom, a hydroxy group, a C$_1$ to C$_{10}$ alkyl group, a C$_1$ to C$_{10}$ alkoxy group, a C$_6$ to C$_{10}$ aryl group which is optionally substituted by halogen atoms, a C$_6$ to C$_{10}$ aryloxy group, a C$_2$ to C$_{10}$ alkenyl group, a C$_7$ to C$_{40}$ arylalkyl group, a C$_7$ to C$_{40}$ alkylaryl group, a C$_8$ to C$_{40}$ arylalkenyl group, an amino group which is optionally substituted by $C_1$–$C_{20}$ hydrocarbon radicals, or an imino group which is optionally substituted by $C_1$–$C_{20}$ hydrocarbon radicals, Y denotes a nitrogen atom, an oxygen atom, a sulphur atom or a group of formula $NR^{10}$, wherein $R^{10}$ has the same meaning as $R^8$ and $R^9$, and a and b represent the numbers 0 or 1, to form a reaction product and reacting said reaction product with c) a co-catalyst.

2. A catalyst system according to claim 1, wherein the molar ratio of said fulvene cyclopentadienyl metal complex to said co-catalyst falls within the range from 1:0.1 to 1:10,000.

3. A catalyst system according to claim 1, wherein the molar ratio of said fulvene cyclopentadienyl metal complex to said unsaturated compound falls within the range from 100:1 to 0.1:1.

4. A method for making a catalyst system comprising the steps of reacting a) a fulvene cyclopentadienyl metal complex of formula (I):

(I)

wherein

M is a metal of the group comprising titanium, zirconium and hafnium,

A denotes a cyclopentadienyl of formula $C_5H_qR^7{}_{5-q}$, where q represents 0, 1, 2, 3, 4 or 5; or an indenyl of formula $C_9H_{7-r}R^7{}_r$, where r represents 0, 1, 2, 3, 4, 5, 6 or 7; or a fluorenyl of formula $C_{13}H_{9-p}R^7{}_p$, where p represents 0, 1, 2, 3, 4, 5, 6, 7 or 8, X denotes a hydrogen atom, a $C_1$ to $C_{10}$ alkyl group, a $C_1$ to $C_{10}$ alkoxy group, a $C_6$ to $C_{10}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a halogen atom or an amide of formula $NR^7{}_2$, $R^1$, $R^2$, $R^3$, $R^4$, $R^5$, and $R^6$ are the same or different and represent hydrogen, a halogen, a cyano group, a $C_1$ to $C_{20}$ alkyl group, a $C_1$ to $C_{10}$ fluoroalkyl group, a $C_6$ to $C_{10}$ fluoroaryl group, a $C_1$ to $C_{10}$ alkoxy group, a $C_6$ to $C_{20}$ aryl group, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, a $C_2$ to $C_{10}$ alkynyl group, a silyl group substituted by $C_1$–$C_{10}$ hydrocarbon radicals, a sulphide group substituted by a $C_1$–$C_{10}$ hydrocarbon radical, or an amino group which is optionally substituted by $C_1$–$C_{20}$ hydrocarbon radicals, or $R^1$, $R^2$, $R^3$, $R^4$, $R^5$, and $R^6$ each form one or more aliphatic or aromatic ring systems together with the atoms which bond them, which ring systems may contain one or more hetero atoms (O, N, S) and comprise 5 to 10 carbon atoms, $R^7$ represents hydrogen, a $C_1$ to $C_{20}$ alkyl group, a $C_6$ to $C_{20}$ aryl group, a $C_7$ to $C_{40}$ arylalkyl group, a $C_7$ to $C_{40}$ alkylaryl group, a silyl group which is substituted by $C_1$–$C_{10}$ hydrocarbon radicals, or an amino group which is optionally substituted by $C_1$–$C_{20}$ hydrocarbon radicals, with b) an unsaturated compound of formula (II):

(II), wherein $R^8$ and $R^9$ are the same or different, and denote a hydrogen atom, a halogen atom, a hydroxy group, a $C_1$ to $C_{10}$ alkyl group, a $C_1$ to $C_{10}$ alkoxy group, a $C_6$ to $C_{10}$ aryl group which is optionally substituted by halogen atoms, a $C_6$ to $C_{10}$ aryloxy group, a $C_2$ to $C_{10}$ alkenyl group, a $C_7$ to $C_{40}$ arylalkyl group, a $C_7$ to $C_{40}$ alkylaryl group, a $C_8$ to $C_{40}$ arylalkenyl group, an amino group which is optionally substituted by $C_1$–$C_{20}$ hydrocarbon radicals, or an imino group which is optionally substituted by $C_1$–$C_{20}$ hydrocarbon radicals, Y denotes a nitrogen atom, an oxygen atom, a sulphur atom or a group of formula $NR^{10}$, wherein $R^{10}$ has the same meaning as $R^8$ and $R^9$, and a and b represent the numbers 0 or 1, to form a reaction product and reacting said reaction product with c) a co-catalyst.

5. A method for making a catalyst system according to claim 4, wherein said fulvene cyclopentadienyl metal complex of formula (I) is produced by reacting a transition metal compound of formula (III):

(III), wherein

A, X, and M have the same meaning as in claim 4, and s denotes the number 1, 2 or 3, L represents a neutral ligand, n is a number from 0 to 4, with a fulvene compound of formula (IV):

(IV)

wherein $R^1$, $R^2$, $R^3$, $R^4$, $R^5$ and $R^6$ have the same meanings as in claim 4; in the presence of a reducing agent.

6. A method of producing the catalyst system according to claim 4, characterized in that the product of said fulvene cyclopentadienyl metal complex and said unsaturated compound is isolated and is subsequently reacted with said co-catalyst.

7. A method of producing the catalyst system according to claim 4, characterized in that the product of said fulvene cyclopentadienyl metal complex and said unsaturated compound is reacted with said co-catalyst without prior isolation.

* * * * *